United States Patent [19]

Tanaka

[11] Patent Number: 5,305,394
[45] Date of Patent: Apr. 19, 1994

[54] CHARACTER INPUTTING APPARATUS

[75] Inventor: Hidekazu Tanaka, Tokyo, Japan

[73] Assignee: Sony Corporation, Tokyo, Japan

[21] Appl. No.: 875,190

[22] Filed: Apr. 29, 1992

[30] Foreign Application Priority Data

Apr. 30, 1991 [JP] Japan ................. 3-126739
May 1, 1991 [JP] Japan ................. 3-128349

[51] Int. Cl.⁵ ............................................. G06K 9/00
[52] U.S. Cl. .............................. 382/13; 382/59
[58] Field of Search ......................... 382/13, 59, 3

[56] References Cited

U.S. PATENT DOCUMENTS

| | | | |
|---|---|---|---|
| 4,653,107 | 3/1987 | Shojima et al. | 382/13 |
| 4,654,873 | 3/1987 | Fujisawa et al. | 382/9 |
| 4,827,530 | 5/1989 | Yamaguichi et al. | 382/13 |
| 4,860,372 | 8/1989 | Kuzunuki et al. | 382/13 |
| 4,944,022 | 7/1990 | Yasujima et al. | 382/14 |

FOREIGN PATENT DOCUMENTS

| | | | |
|---|---|---|---|
| 0254561A2 | 1/1988 | European Pat. Off. | G06F 3/02 |
| 0379336A3 | 7/1990 | European Pat. Off. | G06F 3/033 |
| 3629104A1 | 3/1987 | Fed. Rep. of Germany | G06F 3/033 |

OTHER PUBLICATIONS

Proceedings Tencon 87 IEEE Region 10 Conference, vol. 1, Aug. 25-28, 1987, Seoul, Korea, pp. 91-95; Y. T. Juang: 'On line recognition or handwritten Chinese characters: a syntactic-semantic approach'.
IEEE Micro, vol. 5, Oct. 1984, New York, USA pp. 36-43: W. Doster & R. Oed: 'Word Processing with On-line Script Recognition'.

*Primary Examiner*—Leo H. Boudreau
*Attorney, Agent, or Firm*—Charles P. Sammut

[57] ABSTRACT

An apparatus for recognizing handwritten trace and inputting document information is disclosed which comprises trace means for inputting handwritten characters, coordinate information detection means for detecting locus information provided by said trace means as coordinate information, a display superposed on said detection means for allowing an image displayed thereon to be recognized through said detection means, M character display frames to which said handwritten characters are successively input and in which results of recognition of the locus information are displayed substantially in a cyclic manner, a logical character frame disposed in the vicinity of said character display frame for temporarily displaying N (N>M) characters cyclically input from said character display frames, a writing page portion to which characters displayed in said logical character frame are finally transferred to be displayed thereon, and an operating portion provided within said logical character frame to be operated when M characters out of the characters, N in number at its maximum, displayed in said logical character frame are to be displayed in said character display frames.

7 Claims, 32 Drawing Sheets

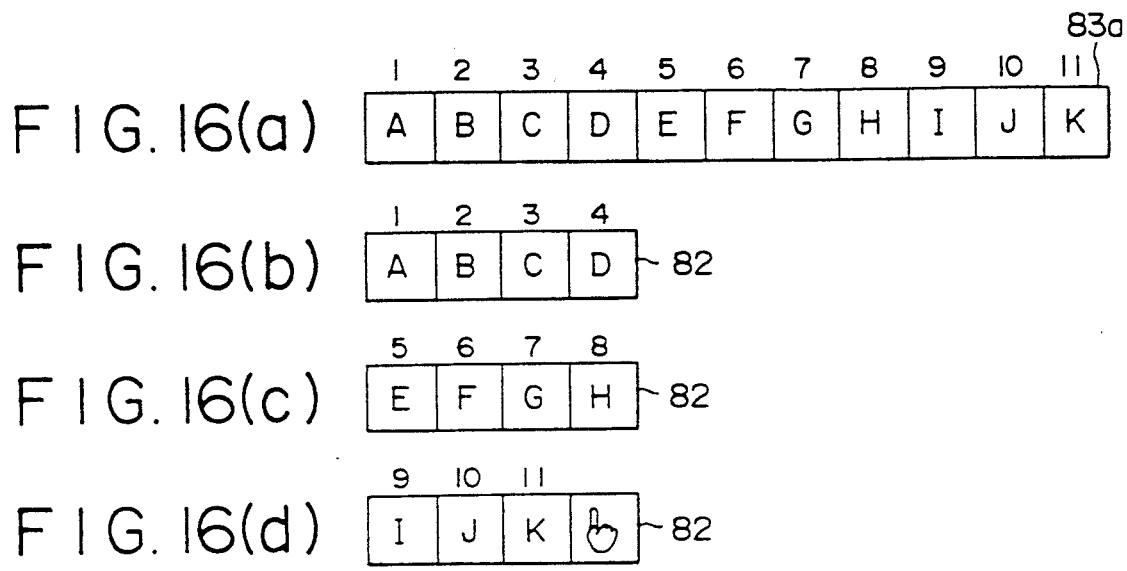
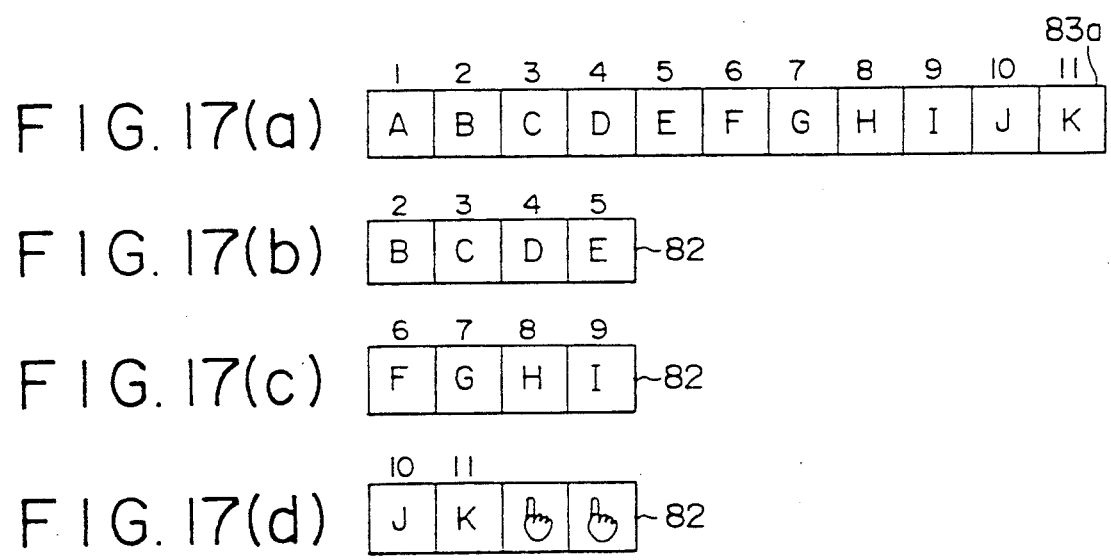

F I G. 33
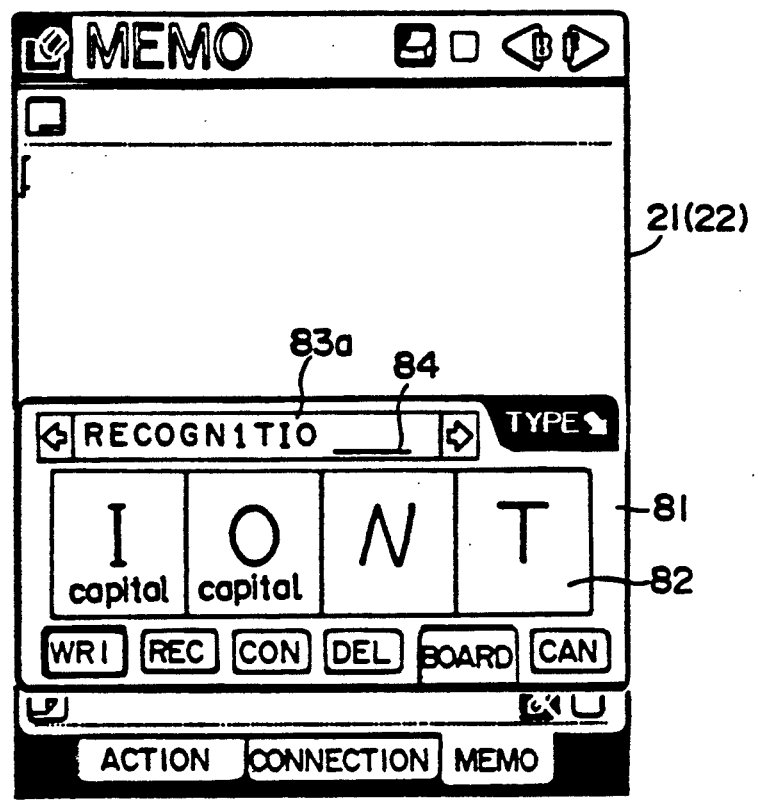
F I G. 34
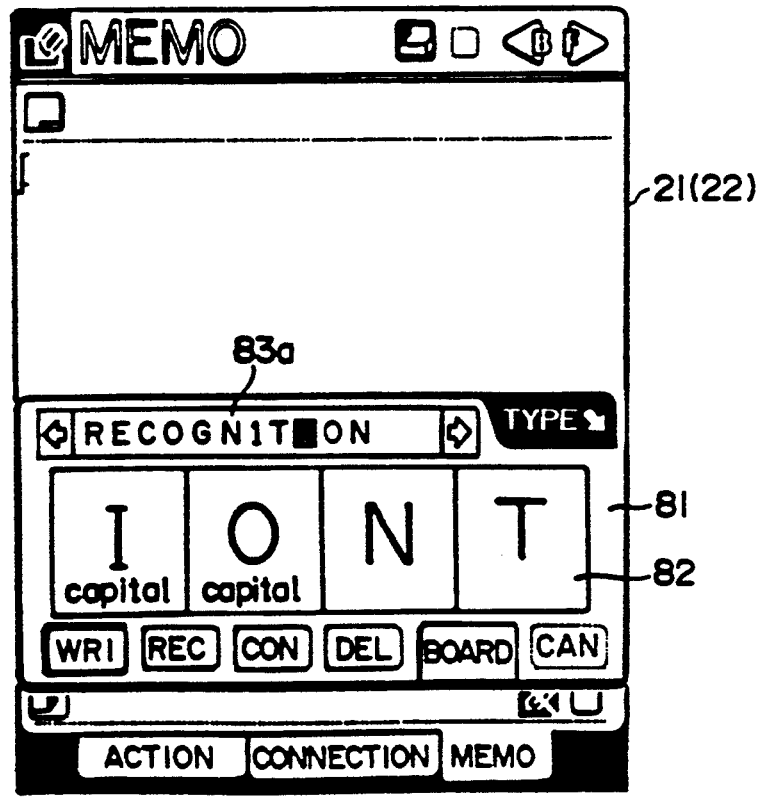

CHARACTER INPUTTING APPARATUS

BACKGROUND OF THE INVENTION

1. Field of the Invention

The present invention relates to a character inputting apparatus suitable for use for example in an electronic pocket notebook apparatus.

2. Description of the Related Art

In the electronic pocket notebook apparatuses, there is a type using a tablet allowing handwritten characters to be input to the apparatus. This type of apparatus is provided with for example 10 character display frames and, when characters are input by handwriting to the character display frames such that one character is put in each frame, the input character is correctly recognized and written on an ultimate writing page portion.

In a conventional apparatus, there are provided a relatively large number (for example 10) of character display frames. Such arrangement makes writing operation easy but makes it difficult to produce portable apparatus of a smaller size. The reason is that, while it is possible to make the character display frame itself smaller, because each character input by handwriting must be recognized, it becomes difficult, if the frame is made too small, to input a character such that the character is correctly recognized and, therefore, the character display frame must have reasonable dimensions.

To overcome such difficulty, it is considered to reduce the number of character display frames while keeping its size sufficiently large and to use such frames cyclically. However, when such reduced number of character display frames are cyclically used, it frequently occurs that input characters are displayed in the order different from an order in which the characters have been input. This might cause some confusion when the user corrects a character once which has been input.

OBJECTS AND SUMMARY OF THE INVENTION

The present invention has been made in view of such situation. Accordingly, a primary object of the present invention is to facilitate the correction or the like of characters once input.

According to an aspect of the present invention, there is provided a character inputting apparatus comprising M character display frames to which characters by handwriting are cyclically input and in which characters obtained as the result of recognition of input characters are displayed, a logical character frame disposed in the vicinity of the character display frame for temporarily displaying N (N>M) characters cyclically input from the character display frames, and a writing page portion onto which characters displayed in the logical character frame are finally written, in which the logical character frame has an operating portion to be operated for displaying M characters out of the characters, N in number at its maximum, displayed in the logical character frame in the character display frames.

In the character inputting apparatus with the above described arrangement, by operating the operating portion provided within the logical character frame disposed in the vicinity of the character display frame, specified characters displayed in the logical character frame can be displayed in the character display frame. Therefore, character correction can be performed easily.

According to another aspect of the present invention, there is provided a character inputting apparatus comprising a plurality of character display frames to which characters by handwriting are cyclically input and in which characters obtained as the result of recognition of input characters are displayed, a logical character frame for successively displaying characters cyclically input from the character display frames, and an operating portion to be operated for displaying characters in a normalized state in the character display frame.

In the character inputting apparatus with the arrangement described above, by operating the operating portion, characters cyclically input from the character display frame can be displayed normalized in the input order in the character display frames. Therefore, checking and correction of characters becomes easy.

Now, in a character inputting apparatus arranged such that characters input by handwriting to the character display frames cyclically are, after being subjected to character recognition, displayed temporarily in the logical character frame serving as a window for character correction, conversion, etc., the logical character frame can accept 10 to 20 characters at the most. When the characters input to the logical character frame have reached the limit and character inputting is further continued, then, by convention, an alarm (beep) was sounded or the excessively input characters were ignored so that a runaway of the program would be prevented.

However, the sounding of the beep was effected only after a character was input beyond the limit on inputting and therefore the user frequently made a wasteful inputting operation and felt displeasure.

Further, the method ignoring the input information beyond the limit on inputting compelled the user to be caring about whether or not the limit to inputting was reached all the time and the operability of the apparatus was thereby deteriorated.

Accordingly, a further object of the present invention is to let the user know that the limit on inputting is reached without giving an unpleasant feeling to the user or causing the user to make wasteful inputting.

According to a further aspect of the present invention, there is provided a character inputting apparatus comprising input display means having a plurality of character display frames to which handwritten characters are input to be displayed therein and control means controlling handwritten characters to be cyclically input to the character display frames and causing a predetermined mark to be displayed in the character display frame when inputting of a handwritten character is to be inhibited.

In the character inputting apparatus with the above described arrangement, when inputting of a handwritten character to a character display frame is to be inhibited, the predetermined mark is displayed in the character display frame. Therefore, the user can readily notice that the limit on inputting is reached before making a further inputting operation.

BRIEF DESCRIPTION OF THE DRAWINGS

FIGS. 16(a)-16(d) are diagrams explanatory of states of display in the embodiment of FIG. 1 when a leftward button or a rightward button is pressed;

FIGS. 17(a)-17(d) are diagrams explanatory of changes in states of display in the embodiment of FIG. 1 when a leftward button or a rightward button is pressed;

FIG. 19 to FIG. 42 are diagrams showing examples of display on the screen in the embodiment of FIG. 1;

DESCRIPTION OF THE PREFERRED EMBODIMENTS

Figure 1:
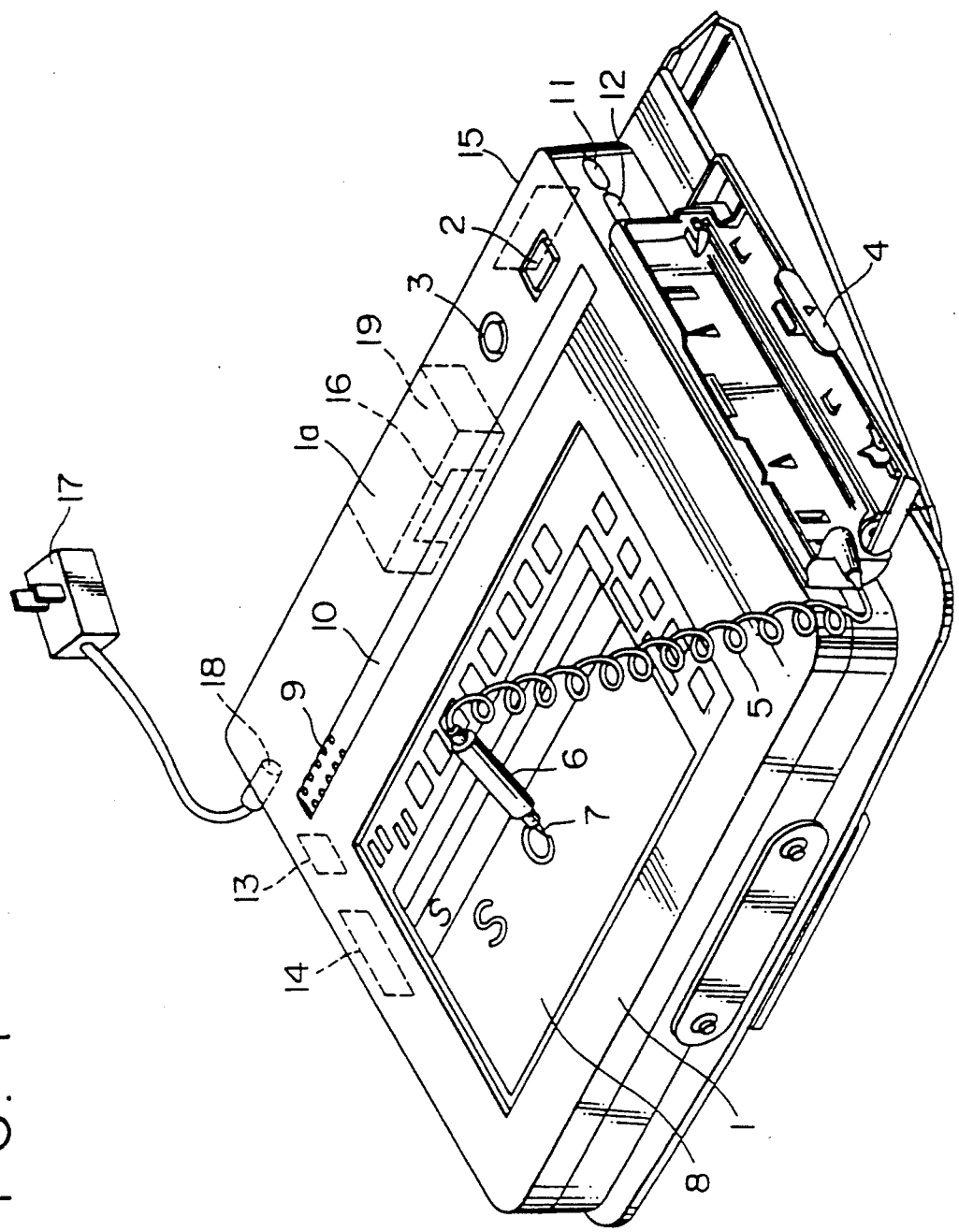
FIG. 1 is a perspective view showing structure of an embodiment of character inputting apparatus according to the present invention.

FIG. 1 is a perspective view showing a structure of an embodiment of the character inputting apparatus of the present invention applied to an electronic pocket notebook apparatus (portable computer). The body 1 is provided with a power switch 2 which is turned on when the apparatus is used and turned off when it is not used. On the left-hand side of the power switch 2, there is provided a luminance adjustment switch 3 for adjusting the luminance of a screen 8 (the luminance of a later described LCD 22). On one side of the body 1, there is provided a case 4. This case is for receiving a pen 6 when it is not used. The pen has a switch 7 on its tip and connected with the body 1 through a cord 5. The pen 6 when taken out from the case 4 can be placed in a groove 10 provided horizontally on the body 1 toward the front end. On the left-hand side of the groove, there is provided a speaker 9 which is adapted to output a preset sound.

There are provided two switches 11 and 12 on the right-hand side face of the body 1 toward the front. The switch 11 is a change-over switch for switching the brightness of the later described back light between for example two steps and the switch 12 is a volume change-over switch for switching the volume of the sound output from the speaker 9 among for example three steps. A switch 13 provided on the left-hand side face of the body 1 is a stop switch to be used when stopping a specific operation midway (for example, when stopping a sound while it is being output). In the left-hand side face of the body 1, there is provided a socket 14 into which a memory (IC) card 70 (refer to FIG. 5) is to be mounted. In the front face of the body 1, there is provided a socket 15. Also, there is a socket 16 in the interior of a battery receiving portion 1a provided in the front face of the body 1 in which a battery 19 is to be inserted. To the socket 15 and 16, the cable and modem of the RS232C type, adapter, etc. are adapted to be connected. On the left-hand side face of the body 1 toward the front, there is provided a connection terminal 18 for an AC adapter 17.

Figure 2:
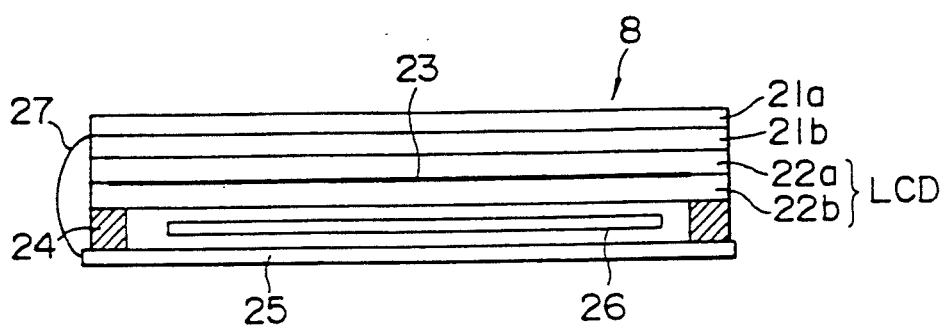
FIG. 2 is a sectional view showing structure of a screen 8 in the embodiment of FIG. 1.

FIG. 2 is a diagram showing an example of the structure of the screen 8 in more detail. In the present embodiment, a tablet 21 (formed of a tablet 21a for detecting position in the direction of X-axis and a tablet 21b for detecting position in the direction of Y-axis) is provided at the topmost level. Below the tablet 21, there is provided an LCD 22. The LCD 22 is formed of an upper glass plate 22a and a lower glass plate 22b with a liquid crystal 23 sandwiched therebetween. Below the LCD 22, there is disposed a fluorescent plate (EL) 26.

When the fluorescent plate 26 as the back light emits light, the light illuminates the LCD 22. Since the tablets 21a and 21b are formed of transparent materials, the image displayed on the liquid crystal 23 can be seen in the direction from the top of the drawing. Parts now shown are arranged in a printed-circuit board (PCB) 25 and electrically connected with the LCD 22 through a rubber connector 24. It is also connected with the tablet 21 through a conductive film 27.

Figure 3:
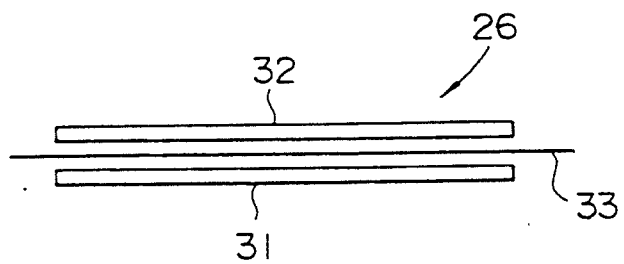
FIG. 3 is a sectional view showing structure of a fluorescent plate in the embodiment of FIG. 2.

FIG. 3 is a diagram showing an example of the structure of the fluorescent plate 26 in more detail. In the present embodiment, an insulating film 33 is disposed between one electrode 31 and a luminescent part (the other electrode) 32. The luminescent part 32 emits light when a predetermined voltage is applied between the electrode 31 and the luminescent part 32. The electrode 31 and the luminescent part 32 are made in plate form and capable of illuminating the screen 8 uniformly.

As another source of the back light, fluorescent tubes can be used. It is also possible to arrange fluorescent tubes as side light source on the sides of the body and transmits the light therefrom to the back side of the LCD 22 through a light transmitting material to provide illumination.

Figure 4:
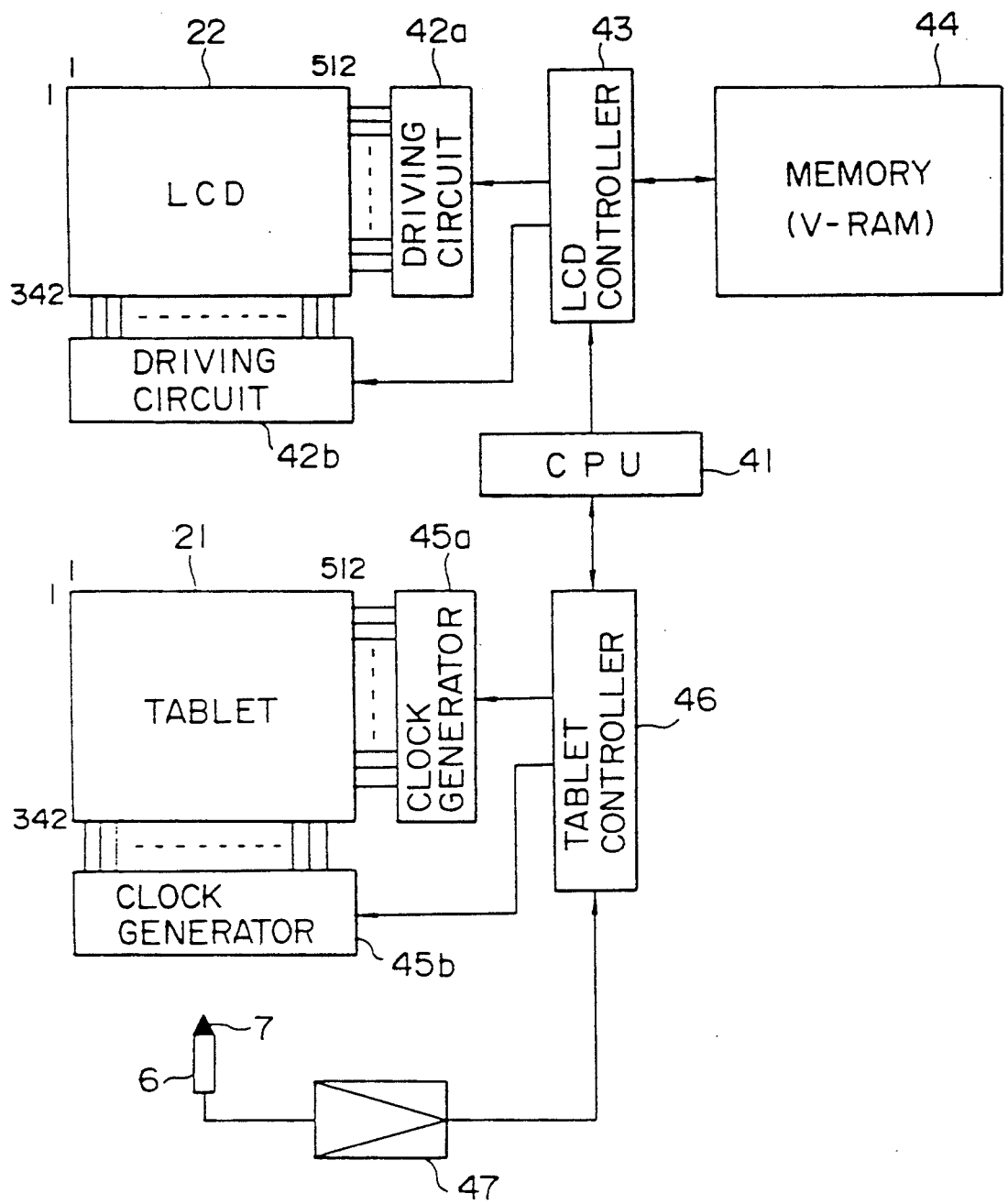
FIG. 4 is a block diagram showing electric connections in the embodiment of FIG. 2.

FIG. 4 is a circuit diagram showing the principle of position detection be means of the tablet and display of images of the LCD. The tablet 21 has for example 512 electrodes juxtaposed in the direction of X-axis and 342 electrodes juxtaposed in the direction of Y-axis. It is thereby made possible to detect 512×342 pixels. A tablet controller 46 controls a clock generator 45a to apply a predetermined voltage to each of the 342 electrodes in succession. Then, a clock generator 45b is controlled so that voltage is applied to each of the 512 electrodes in succession. Thus, the tablet 21 is scanned by means of the clocks generated by the clock generator 45a and the clock generator 45b.

When the pen 6 is brought close to a specific position above the tablet 21, a certain amount of electrostatic capacity is generated between the tablet 21 and the pen 6. When the pen 6 is pressed against the tablet 21, the switch 7 on the tip of the pen 6 is turned on and electric charges generated between the pen 6 and the specific electrode on the tablet 21 are detected and supplied to the tablet controller 46 through an amplifier 47. Since the tablet controller 46 is controlling the timing of clock generation from the clock generators 45a and 45b, it can detect the position on the tablet 21 pressed by the pen 6 from the detection signal supplied from the pen 6 and the clock generation timing. The thus detected coordinate data of the movement of the pen 6 is supplied to the CPU 41.

The CPU 41 controls and LCD controller 43 and writes the data corresponding to the image to be displayed into a memory (V-RAM) 44. The LCD controller 43 reads the data from the memory 44 and supplies signals corresponding to the data to a driving circuit 42b. The LCD 22 has 512 electrodes juxtaposed in the horizontal direction and 342 electrodes juxtaposed in the vertical direction corresponding to the tablet 21. A driving circuit 42a supplies a predetermined voltage to each of the 342 electrodes in succession. Meanwhile, the driving circuit 42b supplies each of the 512 electrodes with voltages corresponding to the image data in succession. The pixels on the LCD 22 are scanned in such manner and thus a specific image is displayed on the LCD 22.

Figure 5:
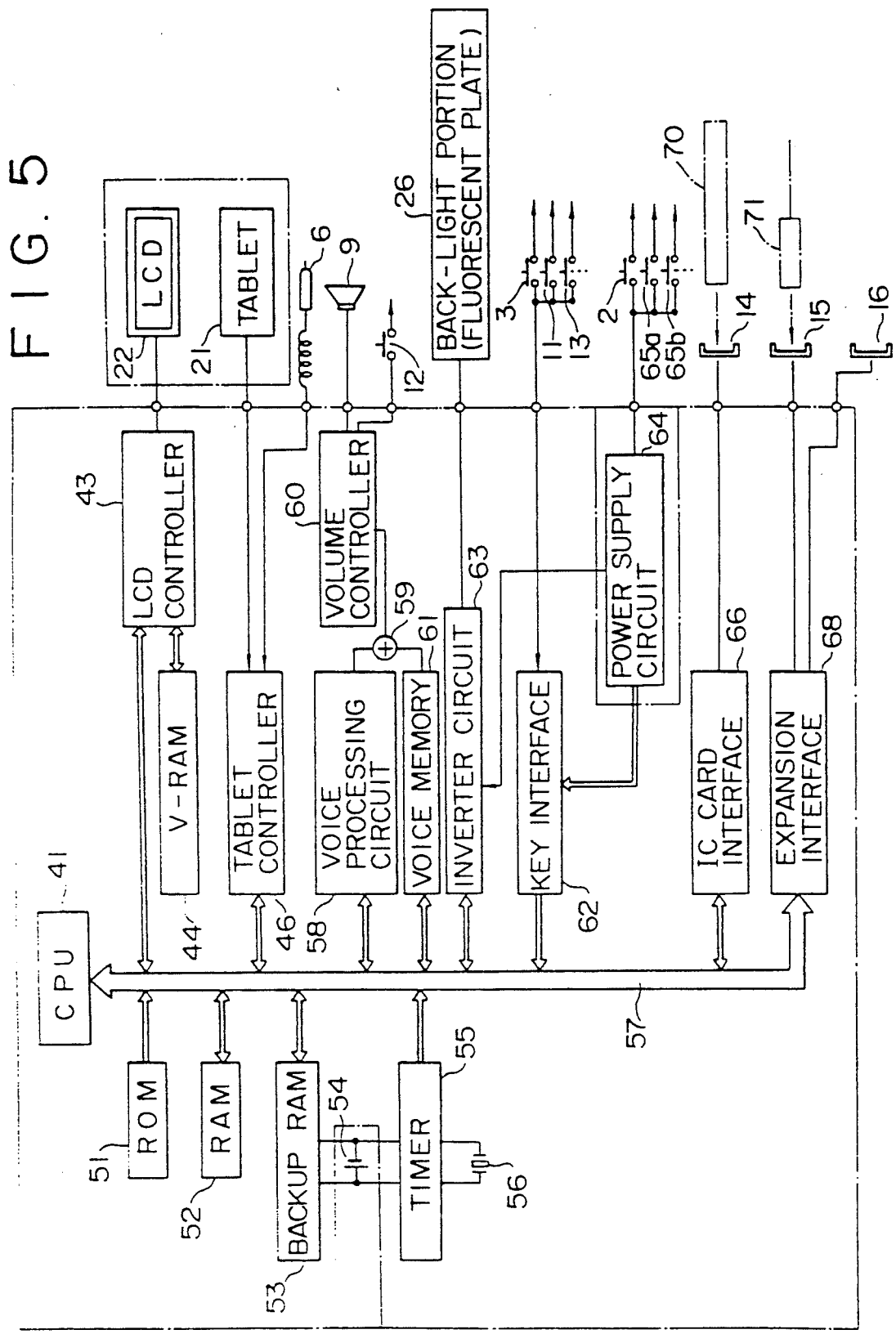
FIG. 5 is a block diagram showing electric connections in the embodiment of FIG. 1.

FIG. 5 is a diagram showing the electric circuit configuration of the body 1 in more detail. The CPU 41 is connected with various ICs and others through a bus line 57. A ROM 51 previously stores a system program for the whole of the apparatus and further stores a kana-kanji conversion program and a dictionary table therefor for a word processing function, a recognition program for handwritten input and a dictionary table therefor, and others. Into a working RAM 52, data necessary for operation are written according to the need.

A backup RAM 53 is connected with a backup battery 54 (separate from the battery 19) whereby necessary data are backed up even when the power supply to the entire apparatus goes off. A timer IC 55 is connected with the battery 54 and counts clocks from a quartz oscillator 56 and output data of the current date and time of the day. The above described LCD controller 43 and tablet controller 46 are also connected with the CPU 41 through the bus line 57.

A voice processing circuit 58 generates predetermined voice signals corresponding to inputs from the sockets 14 to 16 and commands from the CPU 41 and supplies them to an adder 59. A voice memory 61 is controlled by the CPU 41 and outputs predetermined voices (for example an alarming voice "Eh ?") previously stored therein to the adder 59. The adder 59 adds up the output from the voice processing circuit 58 and the output of the voice memory 61 and outputs the sum to the speaker 9 through a voice volume controller 60. The volume controller 60 is connected with the sound volume change-over switch 12, so that the sound volume is controlled by operating the switch.

The fluorescent plate (back light portion) 26 is supplied with power from a power supply circuit 64 (which is supplied with power from the battery 19 or AC adapter 17 when the power switch 2 is turned on) through an inverter circuit 63. The brightness of the fluorescent plate 26 is switched by operating the change-over switch 11 between two steps (for example, brightness suitable for use in a light room and that suitable for use in a dark room) through the inverter circuit 63. Separate from this, the brightness of the LCD 22 is adapted to be controlled as desired in multiple steps by controlling the luminance adjustment switch 3.

A switch 65a is turned on/off depending on whether the battery 19 mounted in the body 1 is a primary battery or it is a secondary battery. A switch 65b is turned on/off depending on detected capacity of the battery 19. The switches 65a, 65b, etc. are connected with a key interface 62 through the power supply circuit 64. The key interface 62 is also connected with the luminance adjustment switch 3, change-over switch 11, stop switch 13, etc. The key interface 62 supplies the CPU 41 with signals corresponding to on/off states of these switches.

An IC card 70 is connected to the socket 14, and the CPU 41 is adapted to supply and receive data, program, etc. to and from the IC card 70 through an IC card interface 66. The socket 15 and 16, to which an adapter 71 is connected, is connected to the CPU 41 through an expansion interface 68.

Although the tablet described above was that of an electrostatic capacity type, a tablet of a pressure-sensitive type may be used instead.

Operation will now be described. In the present embodiment, a type plate 81 as a window is read when specific characters are to be written in a predetermined page 80 as shown for example in FIG. 20. The type plate 81 has four character display frames 82 and a logical character frame 83. The logical character frame 83 has a display portion 83a capable of displaying 11 characters, a leftward button 83b and a rightward button 83c as operating parts to be operated for allowing characters displayed in the display portion 83a to be displayed in a normalized state in the character display frames 82. The logical character frame 83 is provided in the vicinity of the character display frames 82 (above the same in the case of the present embodiment).

As characters are successively input by handwriting in the character display frames 82 one character at a time from left to right, the characters are recognized for pattern and the characters obtained as the result of the recognition are displayed in the frames. When a character has been written in the rightmost character display frame 82, the character following it is written in the leftmost character display frame 82. By using the four character display frames 82 cyclically as described above, it is made possible for the user to continuously write characters without interrupting the flow of thoughts. The characters written in the character display frame 82 as described above are, upon being recognized, sequentially displayed in the display portion 83a of the logical character frame 83 in the input order. Therefore, in the present embodiment, 11 characters can be successively input by handwriting.

While it is possible to directly input a kanji (Chinese character) to the character display frame 82 by handwriting, it is also possible to input kanas (Japanese alphabetical characters) to the character display frames 82 with one kala put in each frame and thereafter convert them into a kanji by operating a conversion button 93. The display portion 83a can display 11 pieces of such converted characters.

By operating a write button 91 upon completion of the conversion, the characters in the display portion 83a can be written in the page 80 at the position where a cursor 90 is located. When characters are written in the page 80, the displays in the display portion 83a and the character display frames 82 are cleared.

When the leftward button 83b or the rightward button 83c is operated in the state where some characters are displayed in the display portion 83a, a cursor 84 located in the display portion 83a moves to the left or right in the drawing, and the characters displayed above the cursor 84 come to be displayed in the character display frames 82. Thus, the user can normalize the cyclically input characters in right order and have them displayed in the character display frames 82.

Otherwise, when a specific character in the display portion 83a is touched with the pen 6, the character is displayed in the leftmost character display frame 82 and the three letters following that character are displayed in the three character display frames 82 adjoining the leftmost character display frame 82. Thus, the normalization can be carried out by touching the leftward button 83b or rightward button 83c or touching a specific character in the display portion 83a.

When one character display frame 82 in the state displaying a character obtained as the result of recognition is touched with the pen 6, the display in the character display frame 82 is cleared and candidate characters for the character which was displayed in the character display frame 82 come to be displayed in the display portion 83a. Then, if the user according to the need selects a specific character from the candidates using the pen 6, the character appears in the character display frame 82 which was cleared previously. Otherwise, by inputting a new character by handwriting in the cleared character display frame 82, the character can be corrected.

Figure 6:
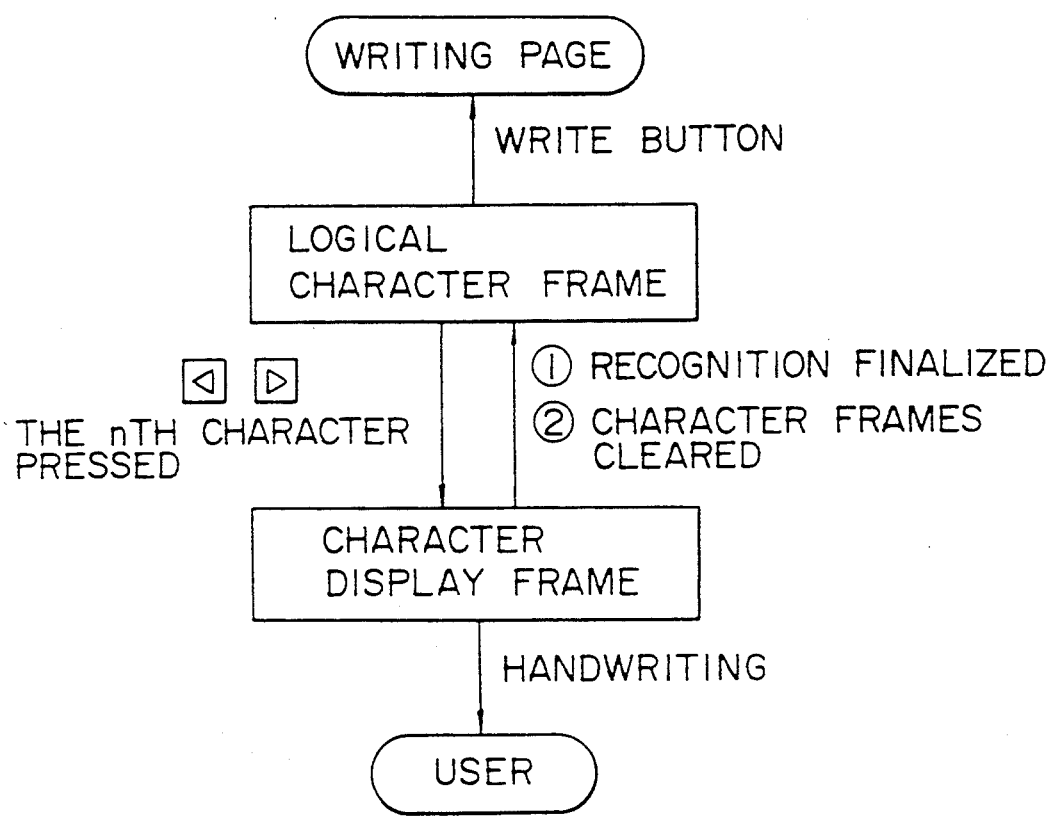
FIG. 6 is a diagram showing an overall flow of operations performed in the embodiment of FIG. 1.

The above described operations are summarized in the chart shown in FIG. 6. That is, when the user inputs a character in the character display frame 82 by handwriting, the strokes of the handwritten input are displayed in the character display frame 82. When the strokes are recognized for pattern and a specific character is obtained, the obtained character is displayed in the character display frame 82 and also displayed in the display portion 83a of the logical character frame 83. If, then, the write button 91 is operated, the characters displayed in the display portion 83a of the logical character frame 83 are written and displayed on each page 80.

Further, by operating the leftward button 83b or the rightward button 83c or pushing an nth character in the display portion 83a, the displayed characters in the display portion 83a of the logical character frame 83 are displayed in a normalized state in the character display frame 82.

The operations for normalization will be described below in detail with reference to FIG. 7 to FIG. 15.

Figure 7:
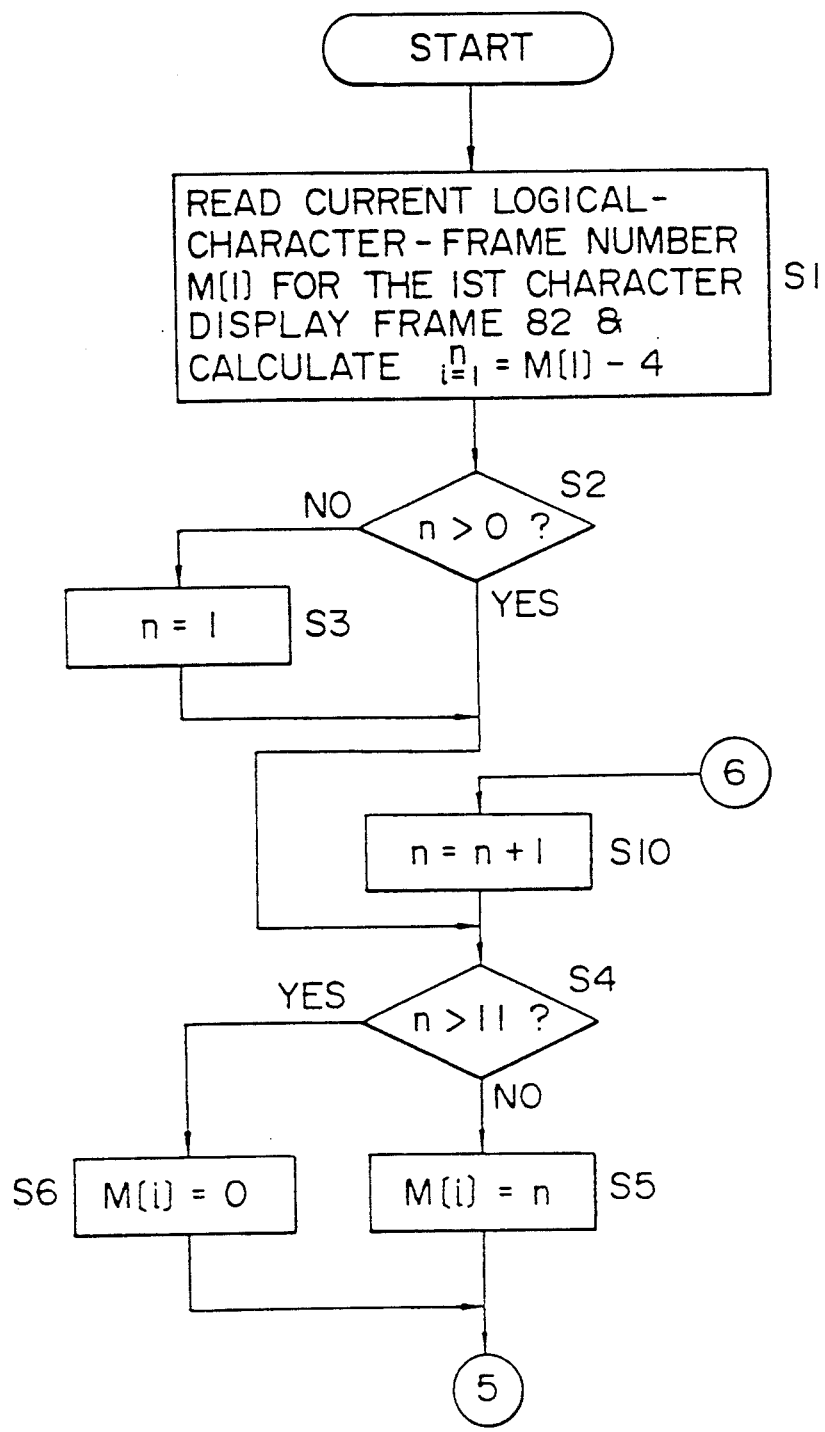
FIG. 7 to FIG. 9 are flow charts explanatory of operations in the embodiment of FIG. 1 when a leftward button is operated.
Figure 8:
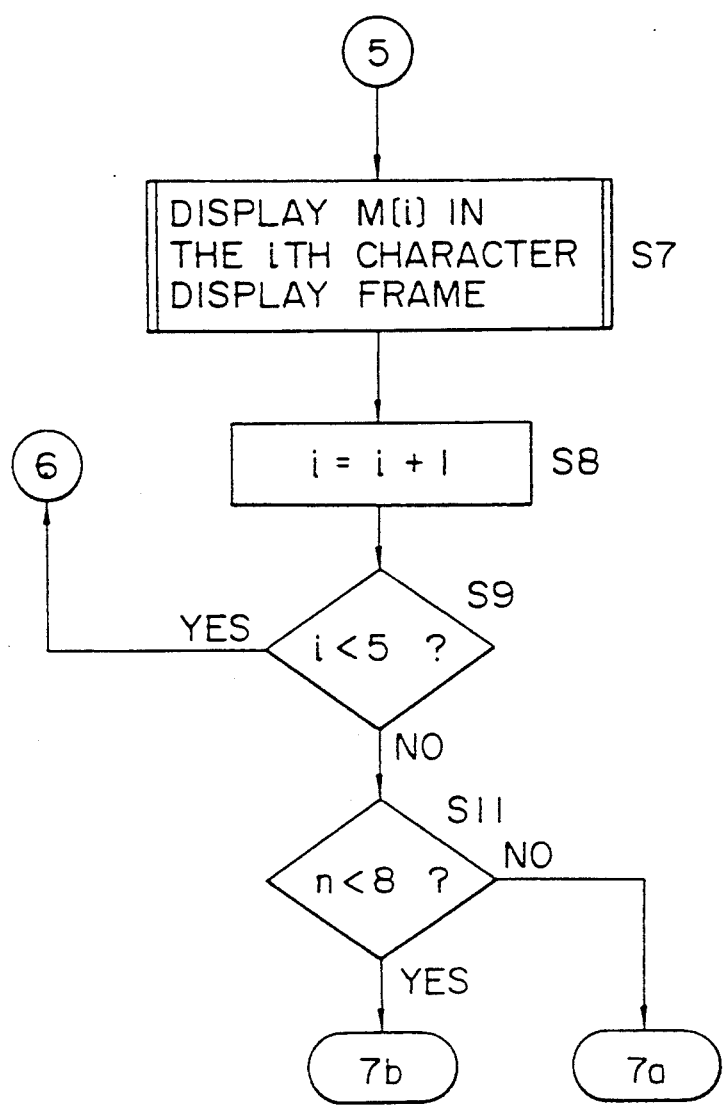
Figure 9:
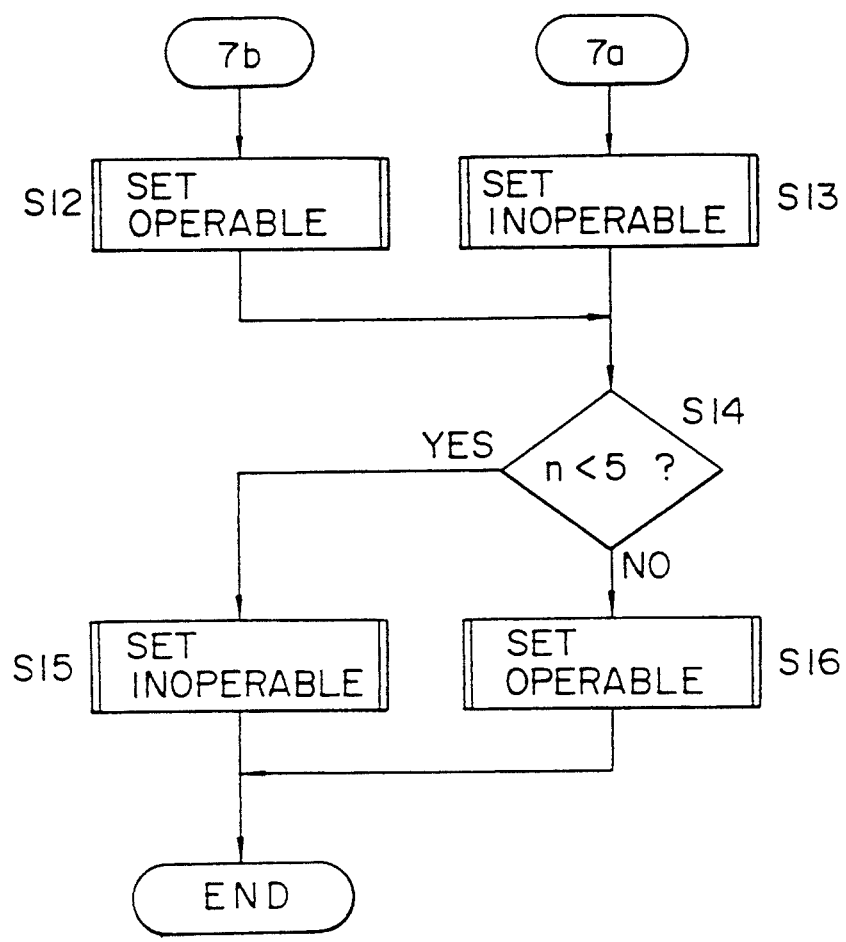

FIG. 7 to FIG. 9 show the steps of processes performed when the leftward button 83b is operated. When the leftward button 83b is operated, first in the step S1, the current logical-character-frame number M [1] for the first character display frame 82 (the leftmost frame in FIG. 20) is obtained and the value obtained by subtracting 4 from the above number is set to a variable n, and further 1 is set to a variable i. Here, the variable n represents the order of a character in the display portion 83a counted from the leftmost position. Hence, the variable n can take on values 1 to 11.

Next, in the step S2, it is decided whether or not the number n is larger than 0. If the variable n is not larger than 0, then, in the step S3, 1 is set to the variable n. Namely, the variable is set to correspond to the first character displayed in the display portion 83a.

After 1 is set to the variable n in the step S3, or when it is decided that the variable n is 1 or above in the step S2, it is decided whether or not the variable n is larger than 11 in the step S4. When it is 11 or below, there is a corresponding character in the display portion 83a, and hence the variable n is set as the logical-character-frame number M[i] for the ith character display frame 82 in the step S5. When the variable n is 12 or above, there is no corresponding character in the display portion 83a, and hence the number 0 is set to the logical-character-frame number M [i] in the step S6. The logical-character-frame number 0 corresponds to an icon indicating that there is present no more character (the mark of a hand shown in FIG. 35).

When the logical-character-frame number M[i] for the ith number of the character display frame is set up in the step S5 or S6, then, in the next step S7, the character of the logical-character-frame number M[i] is displayed in the ith character display frame 82. Since i=1 now, the fourth character on the left side of the character which has been displayed in the leftmost character display frame 82 is now displayed in the leftmost character display frame 82. Then, in the step S8, the variable i is incremented by 1 and it is decided whether or not the variable i is smaller than 5 in the step S9. When the variable i is smaller than 5, namely one of the values from 1 to 4, the flow moves to the step S10 and therein the variable n is incremented by 1. Then, the flow returns to the step S4 and the processes following it are repeated. Namely, characters following the first character display frame are successively displayed in the second to fourth character display frames.

When the variable i is decided to be 5 or above in the step S9, then, in the step S11, it is decided whether or not the variable n is smaller than 8. When the variable n is smaller than 8, namely, one of the values from 1 to 7, then, in the step S12, the rightward button 83c is set operable. On the other hand, when the variable n is 8 or above, then, in the step S13, the rightward button 83c is set inoperable. Since the cursor 84 in the display portion 83a is located at the rightmost position at this time, the cursor cannot be moved further to the right. Therefore, the rightward button 83c is set in the inoperable state.

After the setting of the rightward button 83c has been made in the step S12 or step S13, it is decided, in the following step S14, whether or not the variable n is smaller than 5. When the variable n is smaller than 5, then the leftward button 83b is set inoperable in the step S15. Since the cursor 84 is located at the leftmost position at this time, the cursor 84 cannot be moved further to the left. Therefore, the leftward button 83b is set inoperable. On the other hand, when the variable n is 5 or above, then the leftward button 83b is set operably in the step S16.

Figure 10:
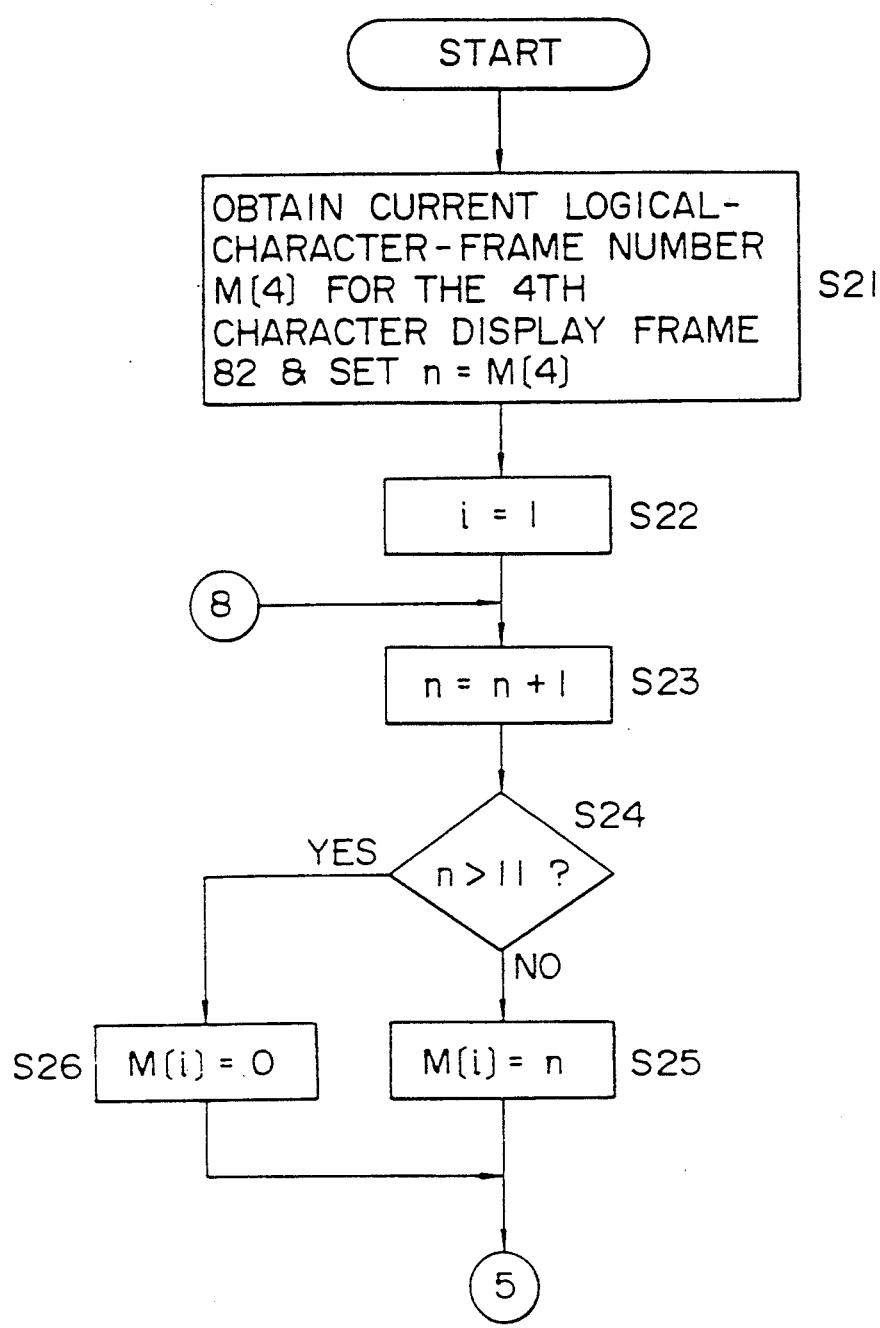
FIG. 10 to FIG. 12 are flow charts explanatory of operations performed in the embodiment of FIG. 1 when a rightward button is operated.
Figure 11:
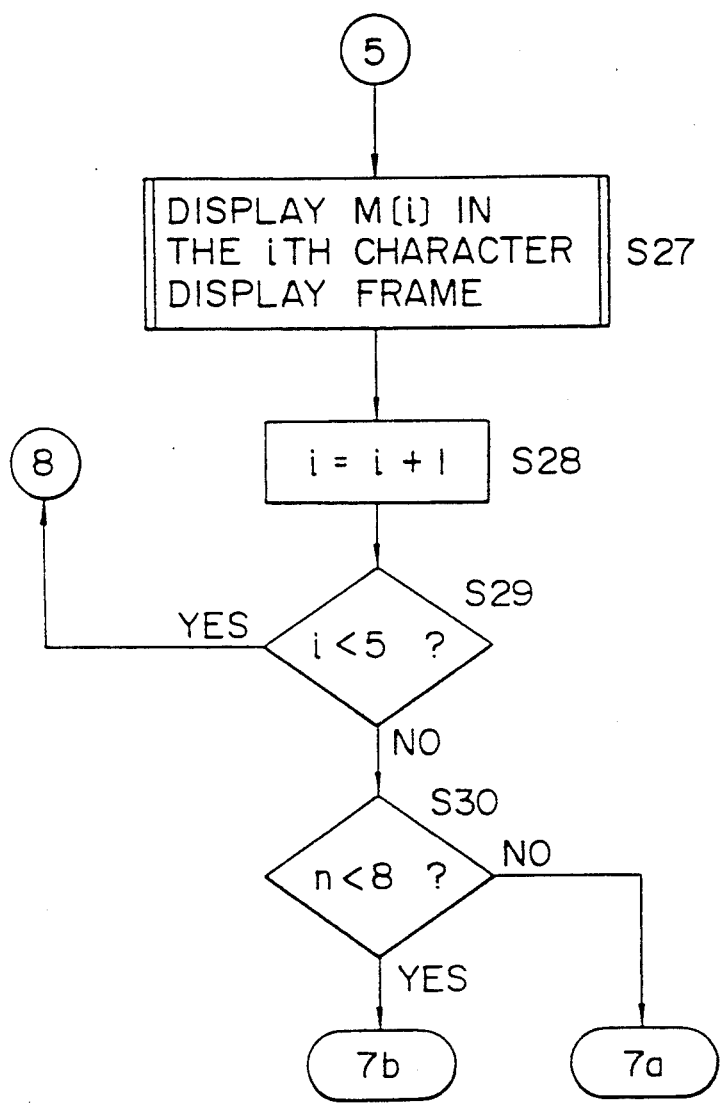
Figure 12:
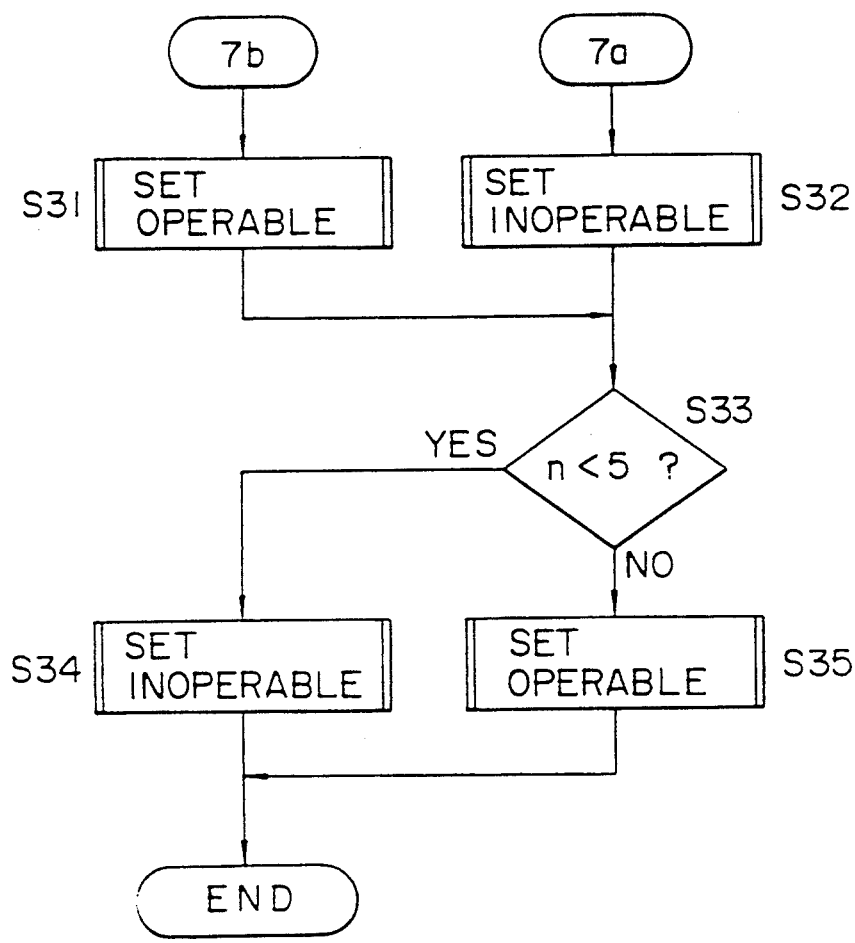

Below will be described the detail of the operations performed when the rightward button 83c is operated with reference to FIG. 10 to FIG. 12.

First, in the step S21, the current logical-character-frame number M[4] for the fourth (the rightmost) character display frame 82 is read. This number is set for the value n. Then, in the step S22, the variable i is set to 1, and in the following step S23, the number n is incremented by 1. Then, in the step S24, it is decided whether or not the number n is larger than 11. When the variable n is 11 is below, the variable n is set to the logical-character-frame number M[i] for the ith character display frame in the step S25. When the variable n is 12 or above, then, in the step S26, 0 is set as the logical-character-frame number M[i] for the ith character display frame. The character for this number 0 corresponds to the mark of a hand shown in FIG. 35 indicating that there is present no more character.

When the logical-character-frame number M[i] for the ith character display frame is set up in the step S25 or step S26, then, in the step S27, the character of the logical-character-frame number M[i] is displayed in the ith character display frame 82. Since i=1 as present, the character next to the character which has been displayed in the rightmost character display frame 82 comes to be displayed in the leftmost character display frame 82. Then, in the step S28, the variable i is incremented by 1 and it is decided whether or not the variable i is smaller than 5 in the step S29. When the variable i is smaller than 5, namely, one of the values from 1 to 4, the flow returns to the step S23, and the processes that follow are repeated. That is, the characters following the first character display frame are successively displayed in the second to fourth character display frames.

If the variable i is decided to be 5 or above in the step S29, then, in the step S30, it is decided whether or not the variable n is smaller than 8. If the variable n is smaller than 8, namely, one of the values from 1 to 7, then, in the step S31, the rightward button 83c is set operable. On the other hand, if the variable n is 8 or above, then, in the step S32, the rightward button 83c is set inoperable. Since, at this time, the cursor 84 is located at the rightmost position, it cannot be moved further to the right. Therefore, the rightward button 83c is set inoperable.

After the setting of the rightward button 83c has been made in the step S31 or S32, it is decided in the step S33 whether or not the variable n is smaller than 5. If the variable n is smaller than 5, the leftward button 83b is set inoperable in the step S34. Since, at this time, the cursor 84 is located at the leftmost position, the cursor 84 cannot be moved further to the left. Therefore the leftward button 83b is set inoperable. On the other hand, when the variable n is 5 or above, the leftward button 83b is set operable in the step S35.

Figure 13:
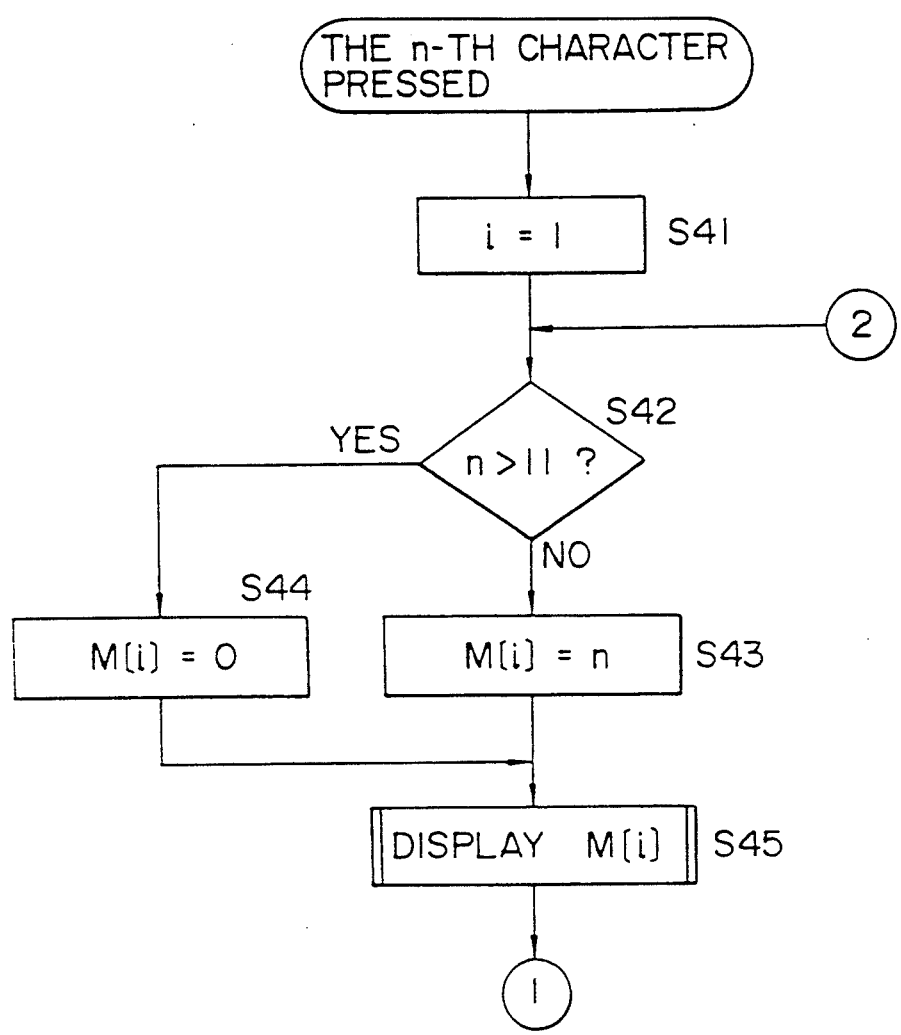
FIG. 13 to FIG. 15 are flow charts explanatory of processes performed in the embodiment of FIG. 1 when an nth character displayed in the display portion of a logical character frame is pressed.
Figure 14:
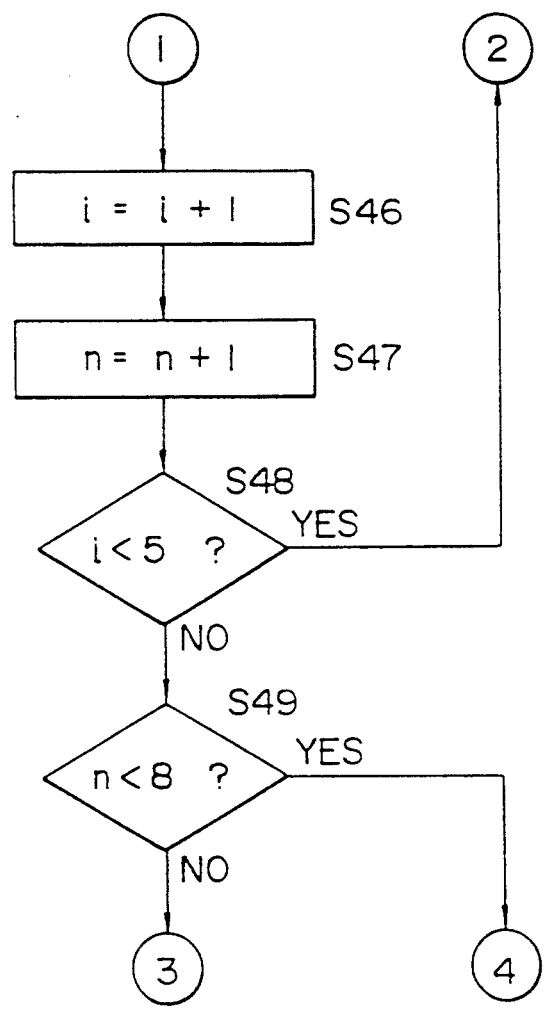
Figure 15:
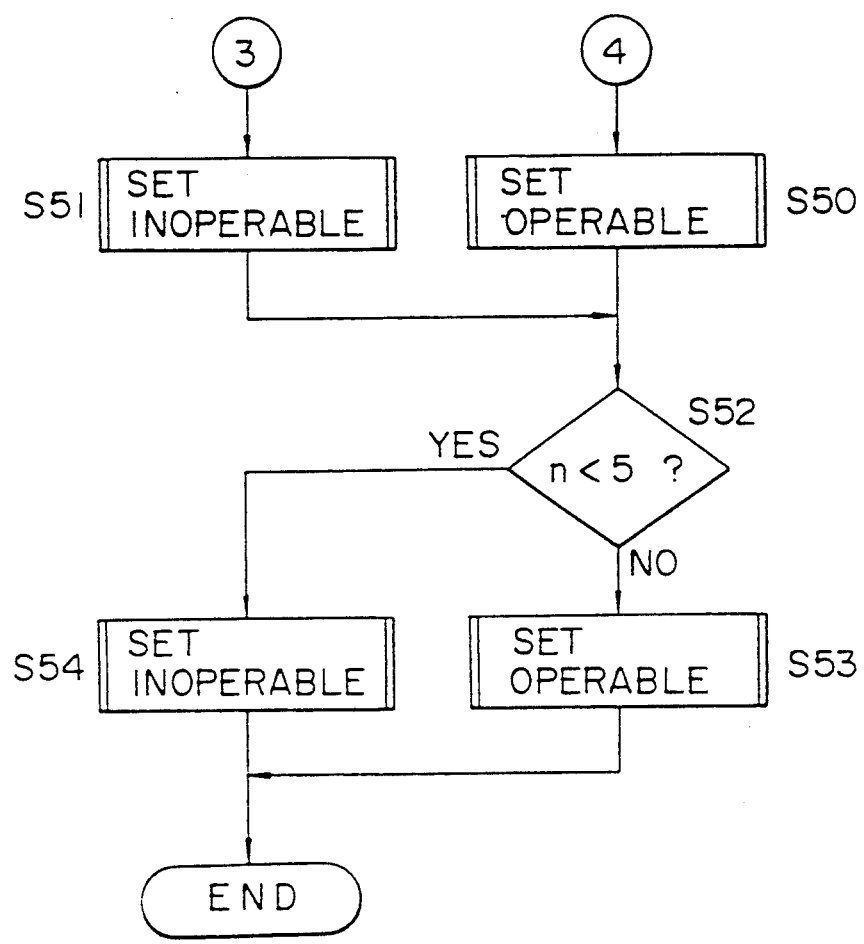

FIG. 13. to FIG. 15 show the processes performed when the nth character of the characters displayed in the display portion 83a of the logical character frame 83 is pressed. In this case, first, in the step S41, the variable i is set to 1, i.e., i=1 is set and the variable n of the logical-character-frame number for the character displayed in the leftmost character display frame 82 is read. Then, in the step S42, it is decided whether or not the variable n is larger than 11. When it is 11 or below, the variable n is set as the logical-character-frame number M[i] for the ith character display frame in the step S43. When the variable n is larger than 11, i.e., 12 or above, then, in the step S44, 0 (the mark of a hand) is set as the logical-character-frame number M[i] for the ith character display frame.

The logical-character-frame number M[i] set up in the step S43 or S44 is displayed in the ith character display frame 82 in the step S45. That is, in the present case, the number is displayed in the leftmost character display frame 82.

Further, in the step S46, the variable i is incremented by 1, and, in the step S47, the variable n is incremented by 1. Then, in the step S48, it is decided whether or not the variable i is smaller than 5. When it is smaller than 5, the flow returns to a the step S42, and the processes that follow are repeated. That is, the characters following the character displayed in the first character display frame 82 are successively displayed in a normalized state in the second to the fourth character display frames 82.

If the variable i is decided to be 5 or above in the step S48, then, in the step S49, it is decided whether or not the variable n is smaller than 8. When the variable n is 8 or above, the rightward button 83c is set inoperable in the step S51. Since, at this time, the cursor 84 is located at the rightmost position in the display portion 83a, the cursor 84 cannot be moved further to the right. Therefore, the rightward button 83c is set inoperable. On the other hand, when the variable n is smaller than 8, the rightward button 83c is set operable in the step S50.

After the setting of the rightward button 83c has been made as described above, it is decided whether or not the variable n is smaller than 5 in the step S52. When the variable n is smaller than 5, the leftward button 83b is set inoperable in the step S54. Since, the this time, the cursor 84 is located at the leftmost position in the display portion 83a, is cannot be moved further to the left. Therefore, the button is set inoperable. On the other hand, when the variable n is 5 or above, the leftward button 83b is set operable in the step S53. Namely, the cursor 84 is made able to move further to the left.

FIG. 16 is a diagram schematically showing the operations in the normalizing process. We suppose now that, as shown in FIG. 16, characters A to K are displayed in the display portion 83a of the logical character frame 83 corresponding to the numbers 1 to 11. Then, when the cursor 84 is located at the leftmost position, there are sequentially displayed characters A to D corresponding to the logical-character-frame numbers 1 to 4 in the character display frames 82 as shown in FIG. 16(b). If, then, the rightward button 83c is operated, the cursor 84 is shifted four characters to the right, and thereby, as shown in FIG. 16(c), four characters E to H corresponding to the logical-character-frame numbers 5 to 8 are sequentially displayed in the character display frames 82. When the cursor 84 is shifted further to the right, characters I to K corresponding to the logical-character-frame numbers 9 to 11 are sequentially displayed in the character display frames 82 as shown in FIG. 16(d). Since there is present no logical-character-frame number 12, the mark of a hand is displayed in the position corresponding to the same.

When the leftward button 83b is operated in the state shown in FIG. 16(d), the state shown in FIG. 16(c) is brought about, and if the leftward button 83b is operated once again, the state as shown in FIG. 16(b) is brought about.

On the other hand, in the state where the characters A to K are displayed, as shown in FIG. 17(a), in the display portion 83a corresponding to the logical-character-frame numbers 1 to 11, if the cursor 84 is located at the position corresponding to the logical-character-frame numbers 2 to 5, then, characters B to E are displayed in the character display frames 82 as shown in FIG. 17(b). If the rightward button 83c is operated once on this state, and once again, the display in the character display frames 82 will successively become as shown in FIG. 17(c) and in FIG. 17(d). If the leftward button 83b is operated likewise, the display will change from the state shown in FIG. 17(d) successively to the state shown in FIG. 17(c) and that in FIG. 17(b).

Figure 18A:
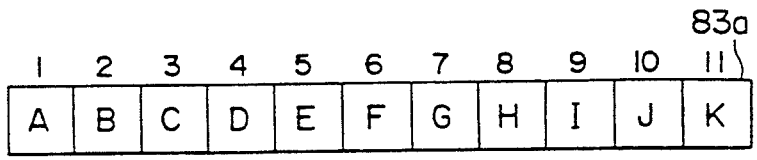
FIGS. 18(a)-18(l) are diagrams explanatory of changes in displays in the embodiment of FIG. 1 when a character displayed in the display portion of a logical character frame is pressed.
Figure 18B:
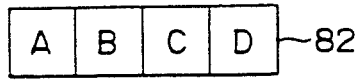
Figure 18C:
Figure 18D:
Figure 18E:
Figure 18F:
Figure 18G:
Figure 18H:
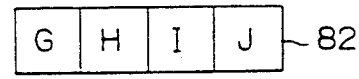
Figure 18I:
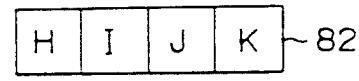
Figure 18J:
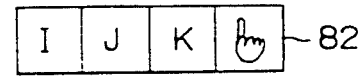
Figure 18K:
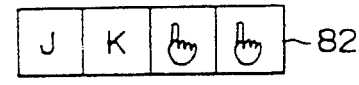
Figure 18L:
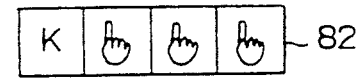

The state shown in FIG. 17(b) corresponds to a later described state shown in FIG. 18(c) which is brought about by specifying the logical-character-frame number 2 with the pen 6 for normalization.

FIG. 18 shows a normalized state when a specific character of the characters displayed in the display portion 83a of the logical character frame is pressed with the pen 6. More specifically, when characters A to K are displayed in the display portion 83a corresponding to the logical-character-frame numbers 1 to 11 as shown in FIG. 18(a), if a specific character of the logical-character-frame numbers 1 to 11 is pressed with the pen 6, the state of characters in the character display frames 82 is changed as shown in FIG. 18(b) to FIG. 18(l). It is known that any of the cases is normalized. It follows from this that there is substantially provided an operating portion for achieving normalization also within the display portion 83a.

Below will be given description of operations such as character inputting operation, character correcting operation, and normalizing operation on the basis of particular display examples of the screen with reference to FIG. 19 to FIG. 42.

Figure 19:
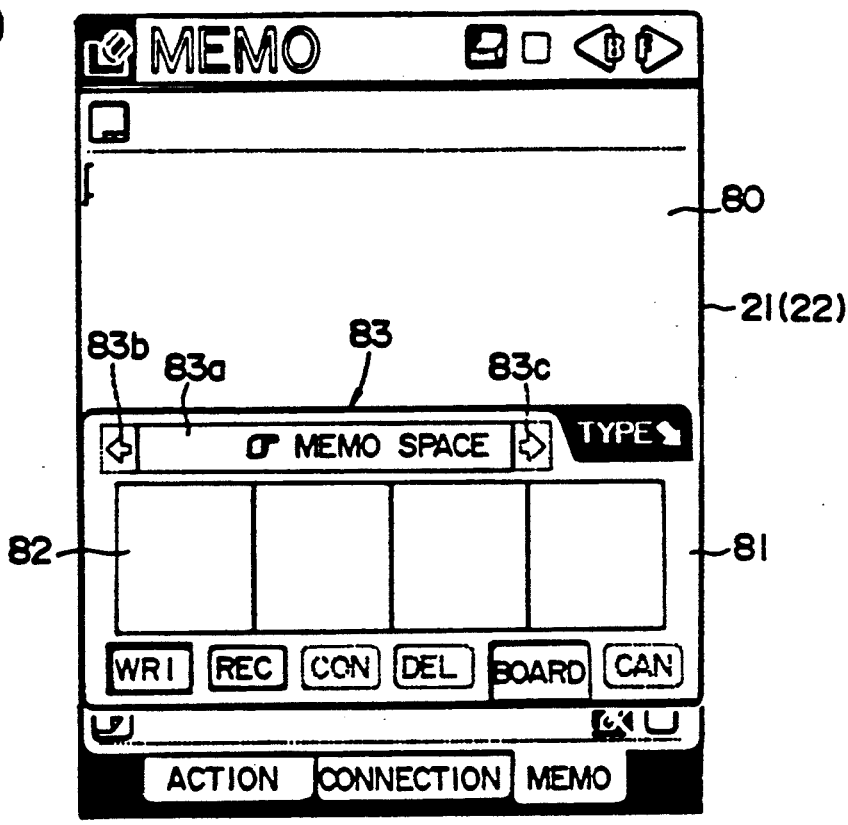
Figure 20:
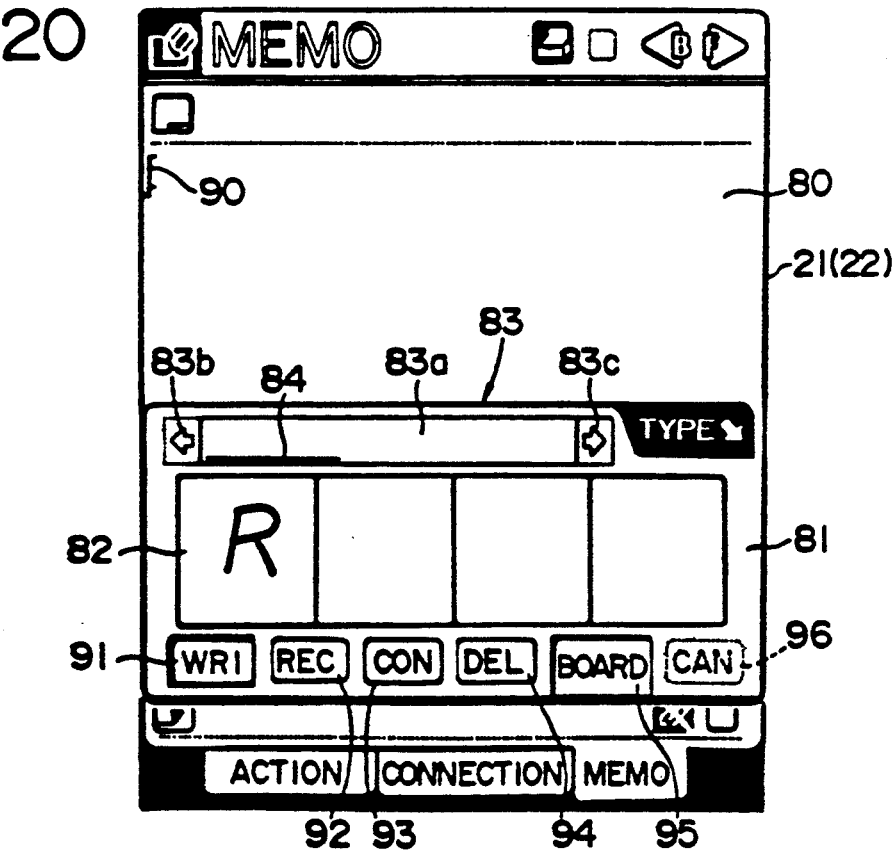
Figure 21:
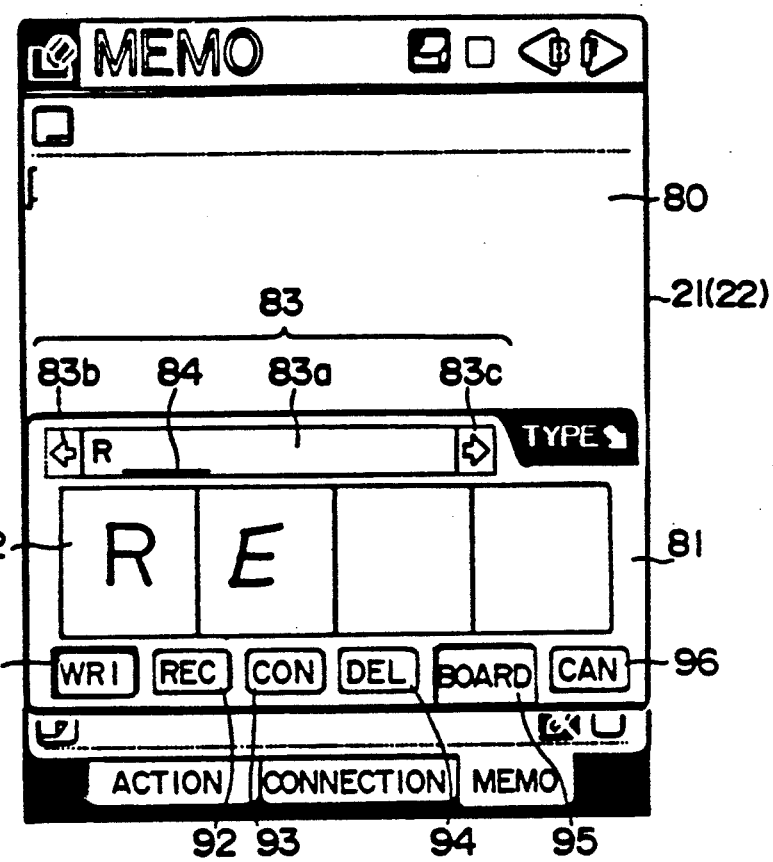

FIG. 19 shows a state where the type plate 81 is read onto the page 80. In this state, if a capital R is input by handwriting with the pen 6 in the leftmost character display frame 82 as shown in FIG. 20, the strokes made with the pen 6 are detected by the tablet 21 and the traced loci are displayed on the LCD 22. FIG. 21 shows a state where a character E is further input by handwriting in the second character display frame 82. At this time, the capital R first input has already been recognized and the recognized result is displayed. Since the recognition has been completed, the capital R is displayed in the display portion 83a of the logical character frame 83.

Figure 22:
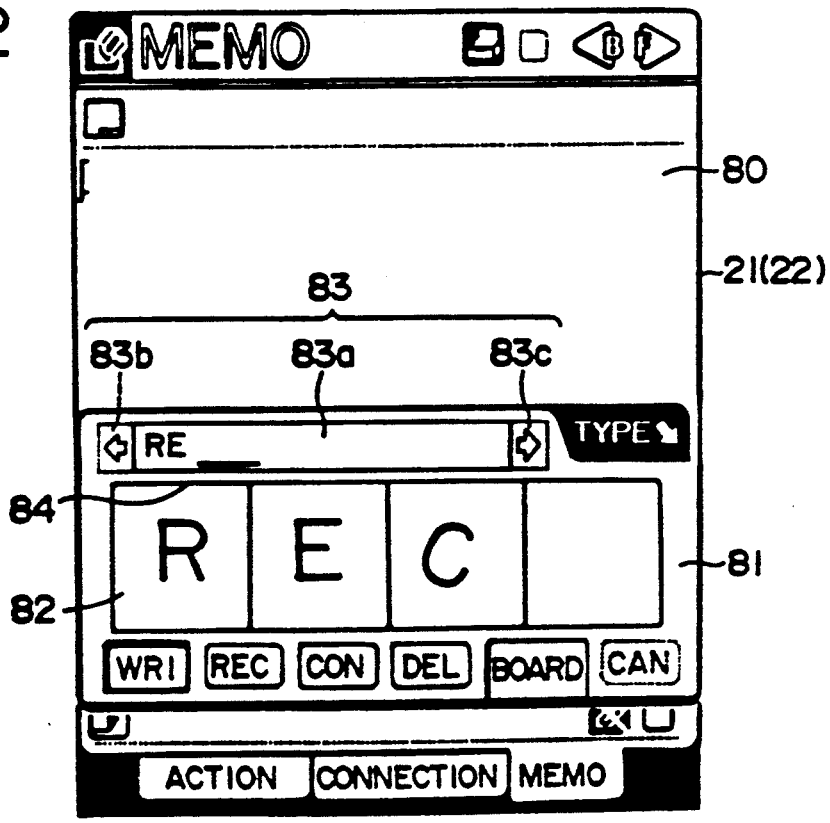

FIG. 22 shows a state where a capital C is input by handwriting in the third character display frame 82. At this time, the capital E written in the second character display frame 82 has already been recognized and hence it is displayed in the display portion 83a.

Figure 23:
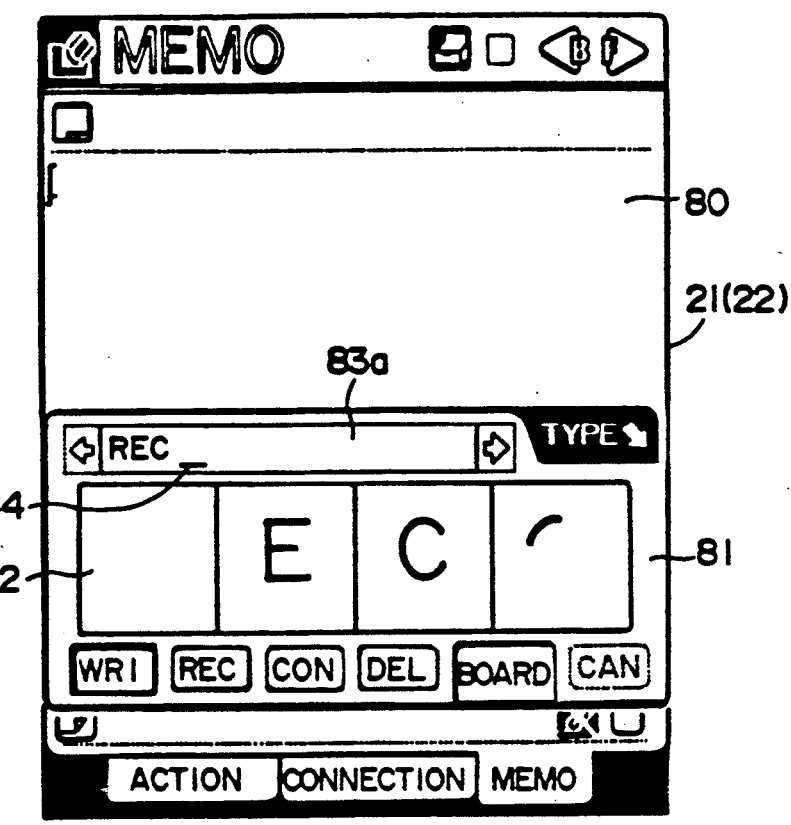

Thereafter, when the writing of the fourth character in the fourth character display frame 82 is started as shown in FIG. 23, the character corresponding to the fifth number of the display portion 83a of the logical character frame 83 comes to be displayed in the first (the leftmost) character display frame 82. Since the fifth character of the display portion 83a is now a space, the first character display frame of the character display frame 82 is made blank. Thereby, the character display frame in which the fifth character is to be written after finishing the writing of the character in the fourth character display frame 82 is arranged to be the leftmost character display frame. Thus, by the use of the four character display frames 82 in a cyclic manner, characters can be input in succession.

Figure 24:
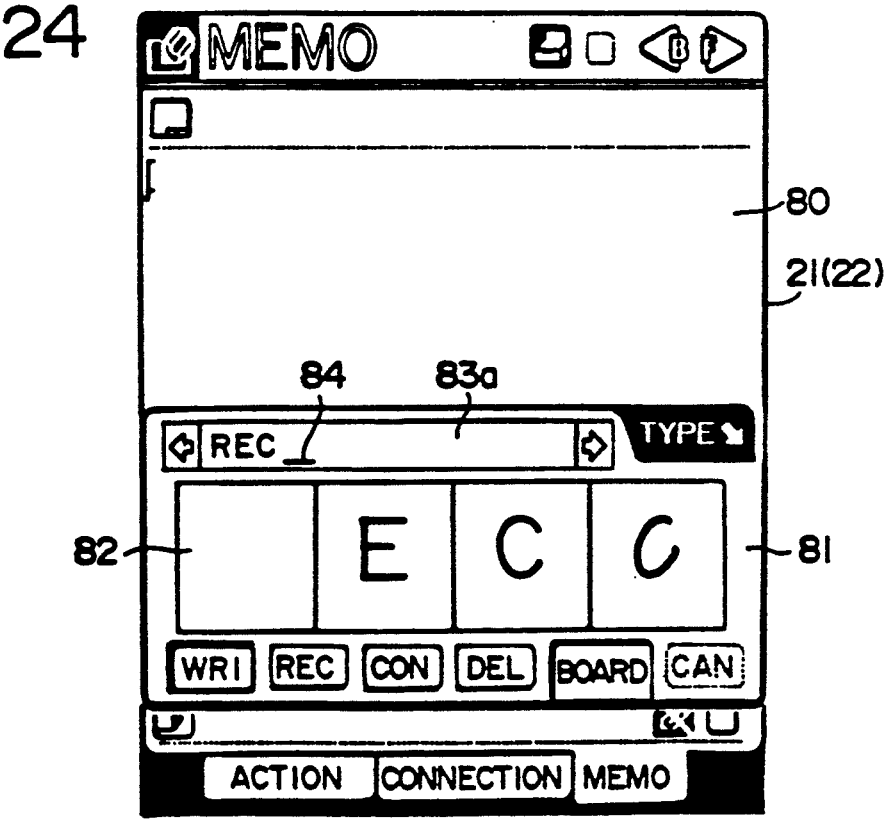
Figure 25:
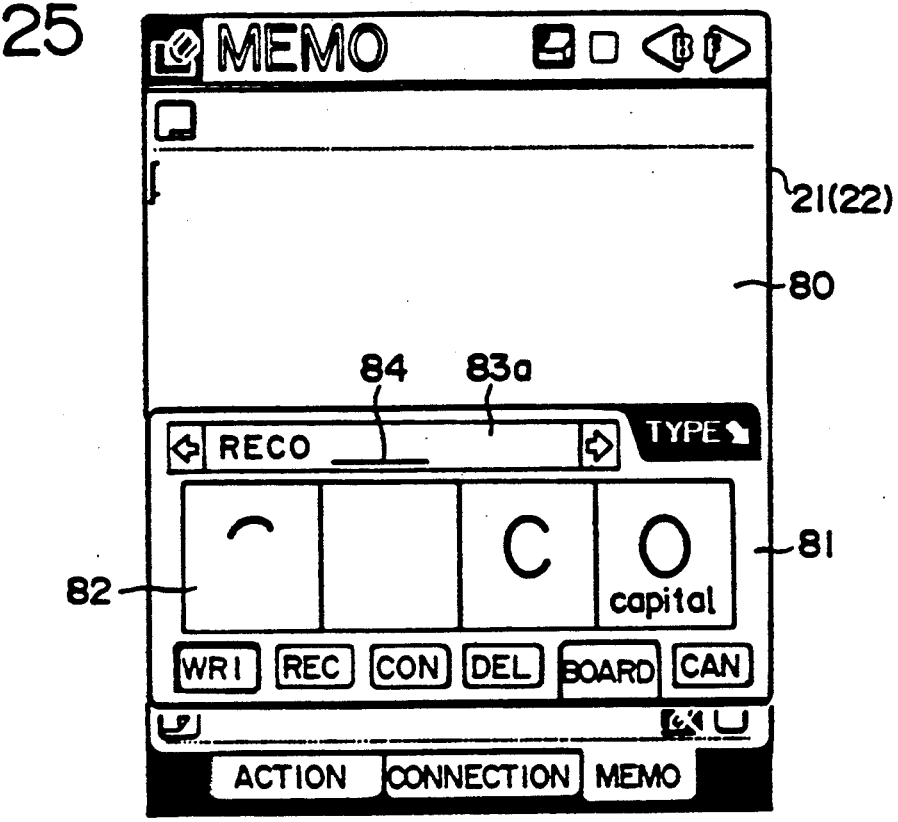
Figure 26:
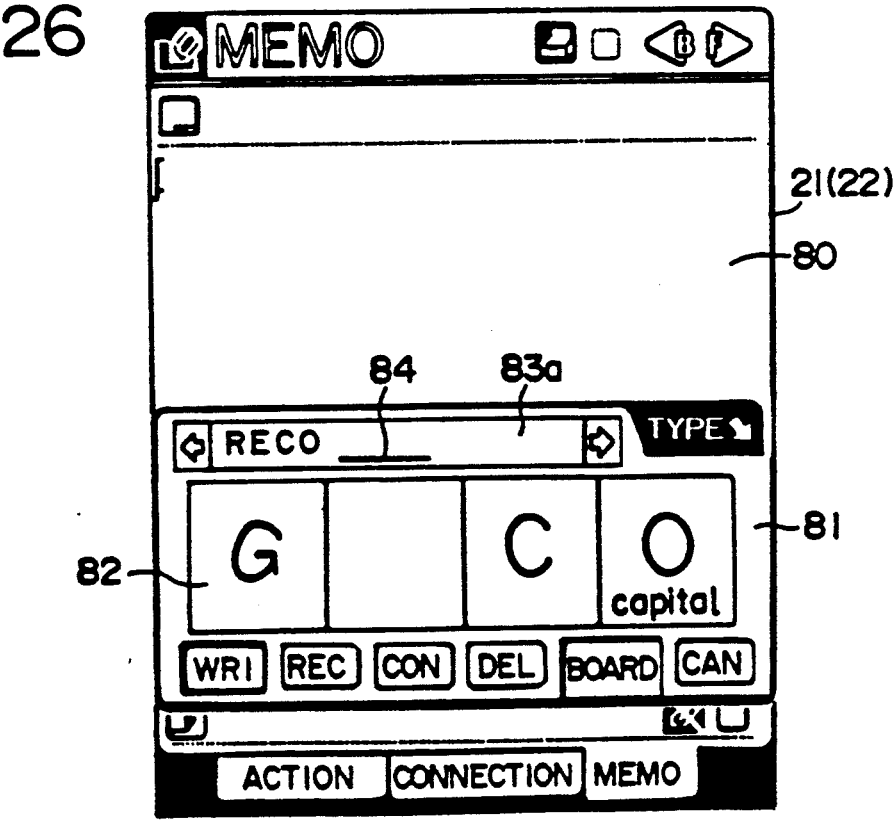
Figure 27:
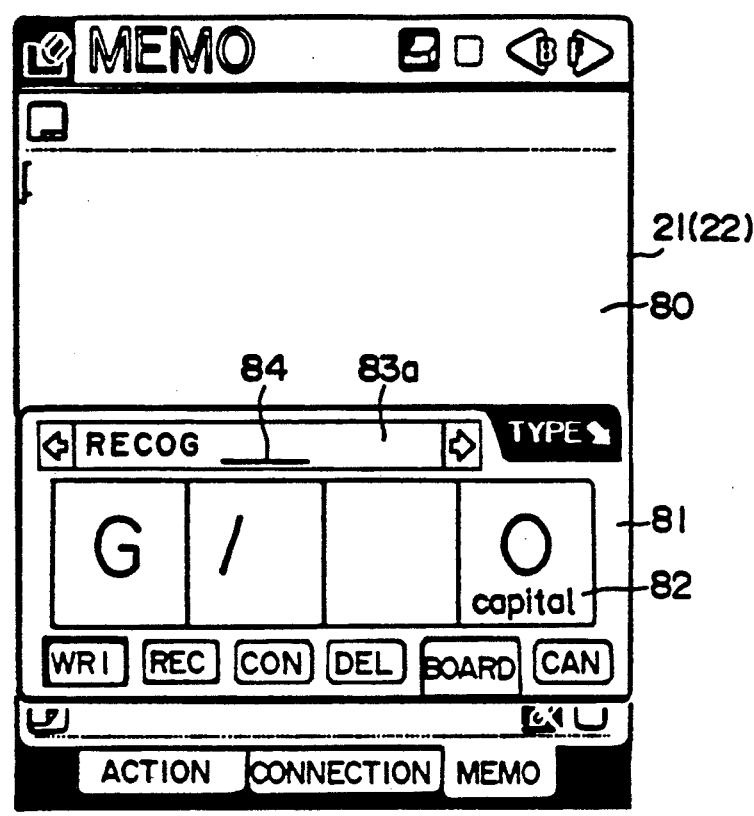
Figure 28:
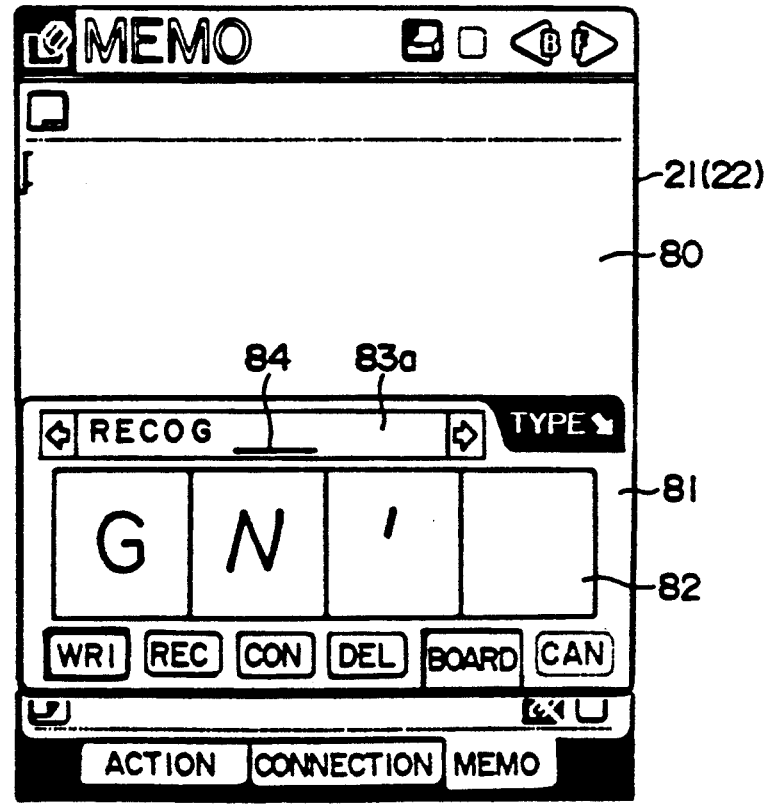
Figure 29:
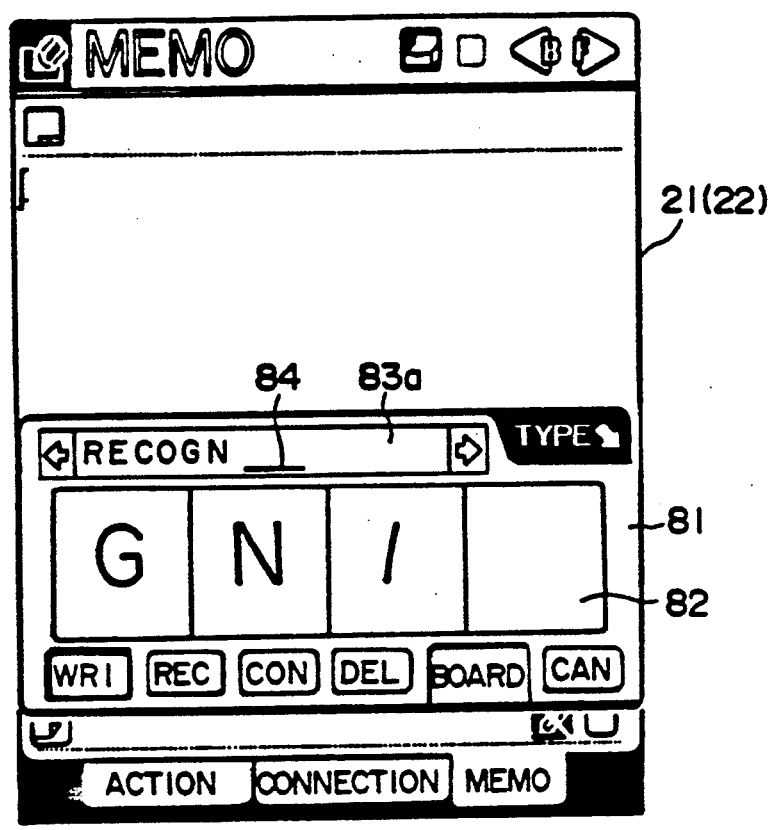
Figure 30:
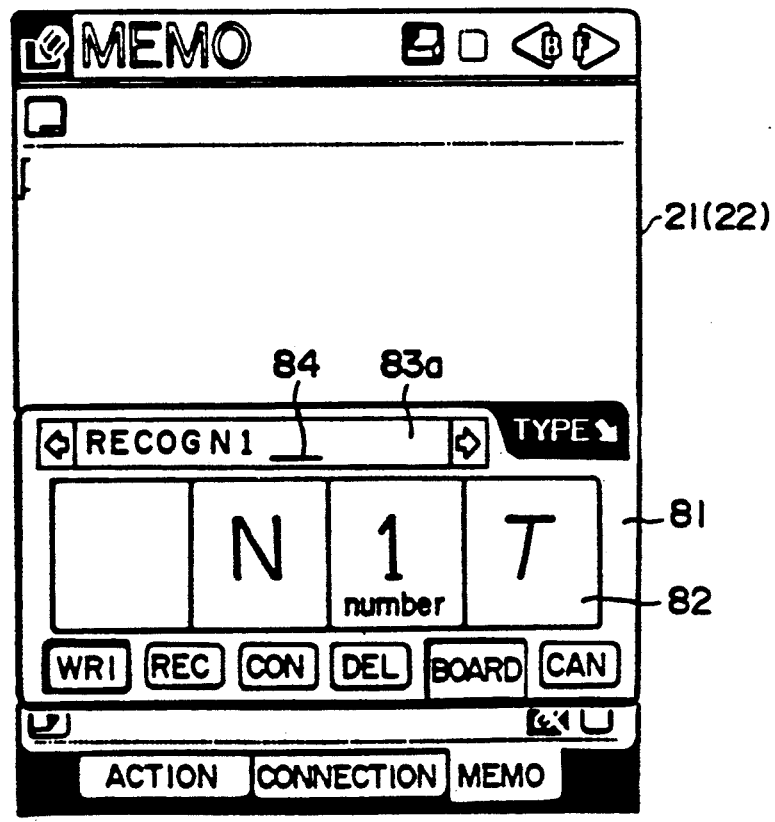
Figure 31:
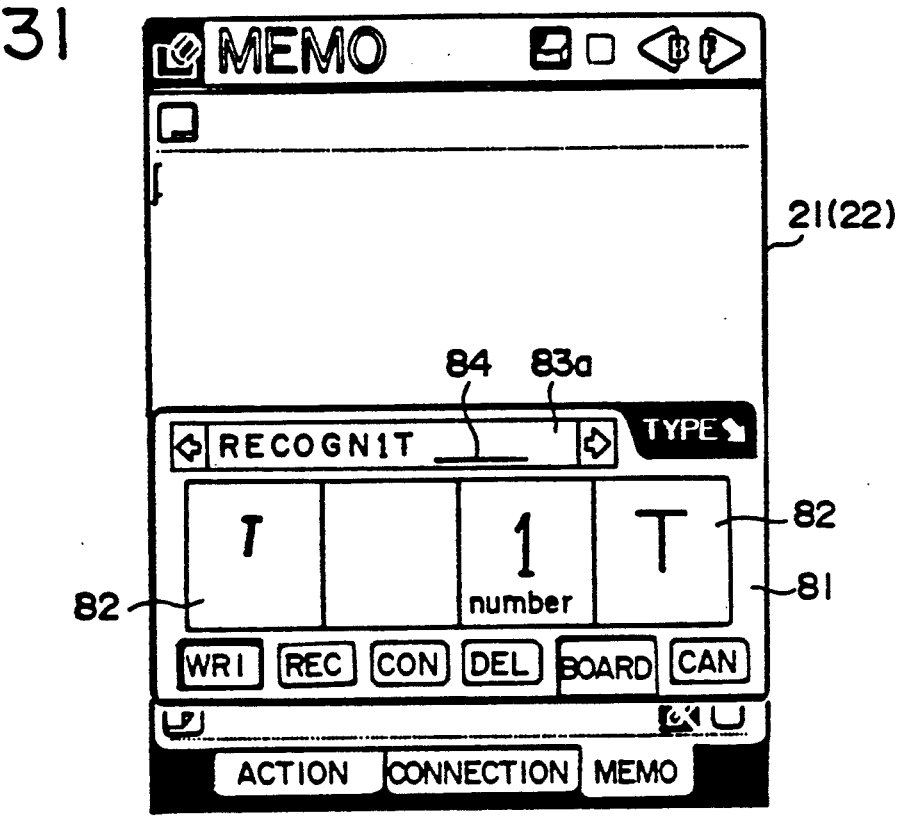
Figure 32:
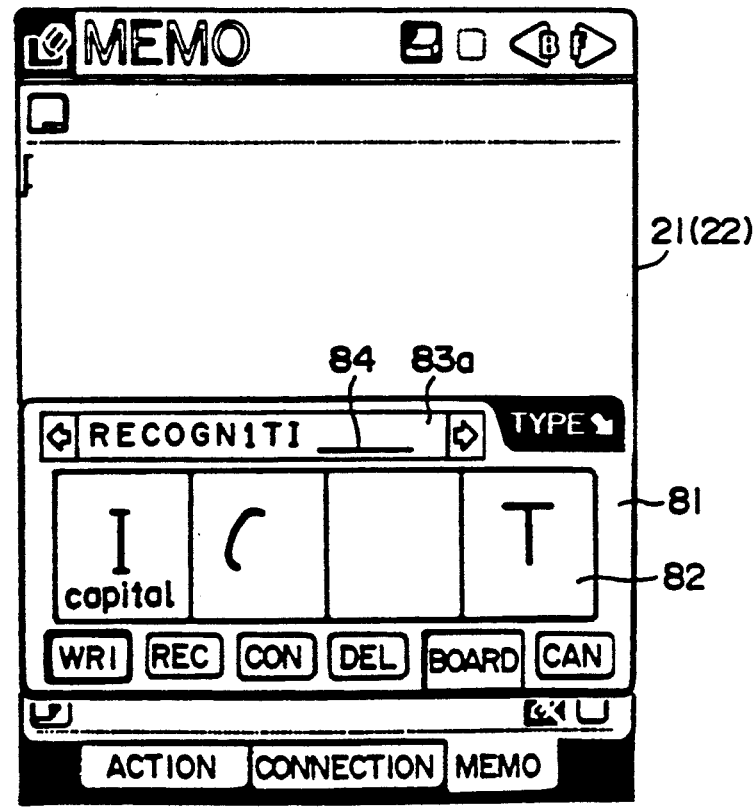

Following the inputting of O in the rightmost character display frame 82 as shown in FIG. 24 and FIG. 25, if writing of the next character in the leftmost character display frame 82 as the fifth character display frame is started, the character of the logical-character-frame number 6 is displayed in the next character display frame 82 on the right side. Since, in this case, the character is a space, the same as above, the character display frame 82 is made blank.

FIG. 26 to FIG. 33 show changes in the state while capitals 'RECOGNITION' are progressively input.

Figure 35:
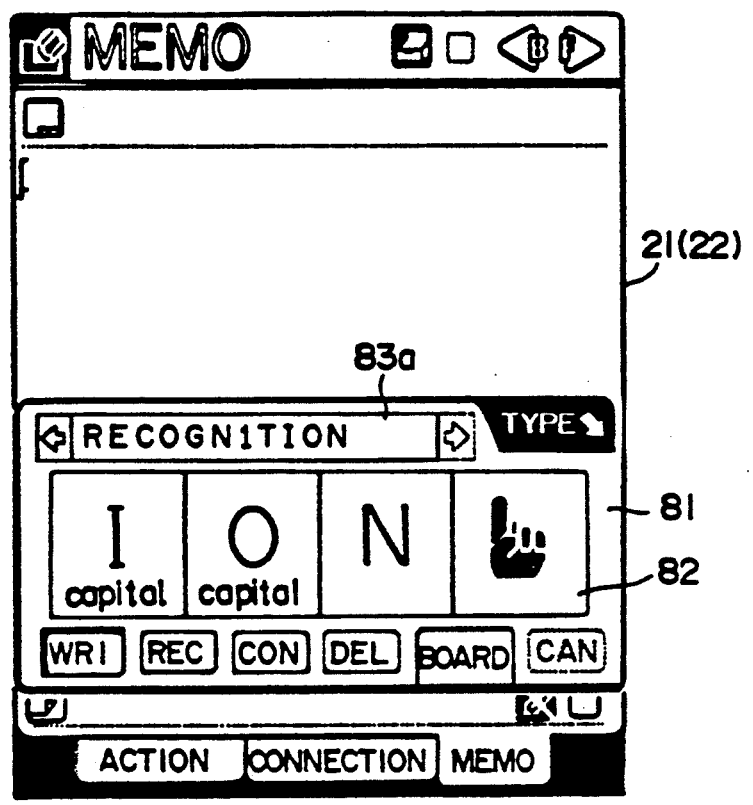

As described above, 11 characters can be input to the display portion 83a. Accordingly, when normalization is not yet made, as shown in FIG. 34, the capital T of the logical-character-frame number 8 is displayed in the rightmost character display frame 82, while the capitals 'ION' are displayed in the three character display frames 82 on the left side. That is, in this case, the displayed order of the characters is not corresponding to the input order of the characters. Then, if the capital I of the logical-character-frame number 9 is pressed with the pen 6, the display of the capital I in the display portion 83a is reversed. Then, if the pen 6 is separated from the display portion 83a, the display in the character display frame 82 is normalized as shown in FIG. 35. Namely, capitals 'ION' are displayed in the three character display frames 82 on the left side and a mark of a hand indicating that there is present no more character is displayed in the rightmost character display frame 82.

Figure 36:
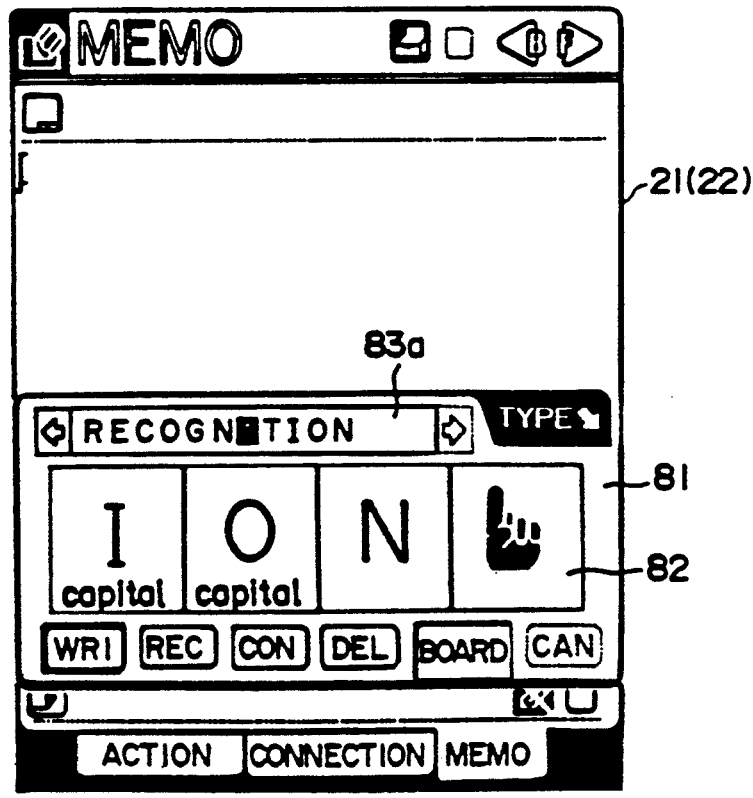
Figure 37:
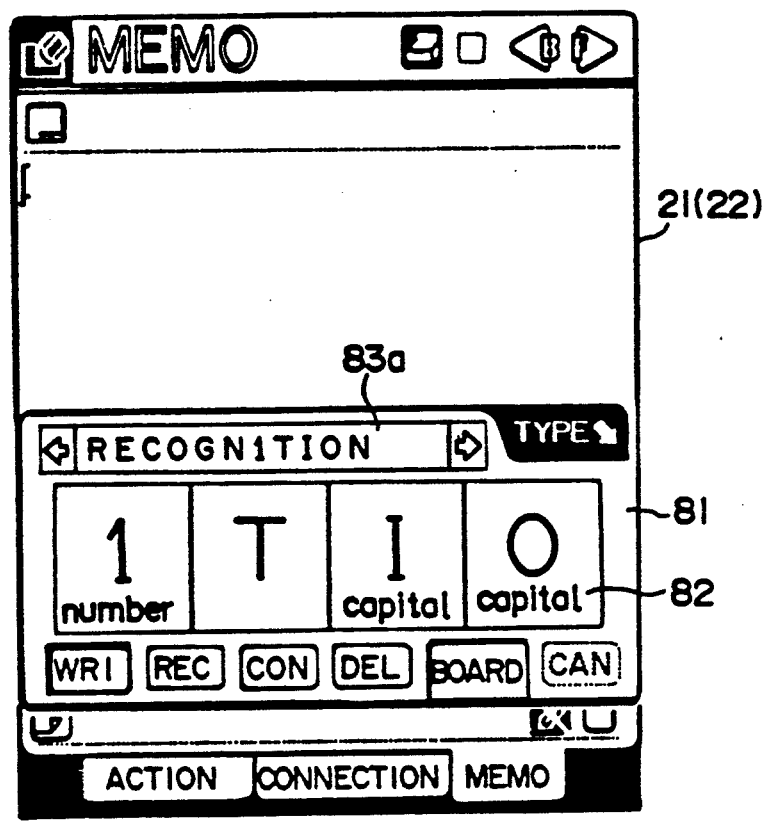

Now, the character displayed in the display portion 83a next to RECOGN is, in fact, not a capital I but a number 1. To correct this, the number 1 in the display portion 83a is given a touch of the pen 6. Then, as shown in FIG. 36, the display of the number 1 is reversed. Then, if the pen 6 is separated from the number 1, four characters 1TIO with the number 1 at the head are displayed in the character display frame 82 as shown in FIG. 37.

Figure 38:
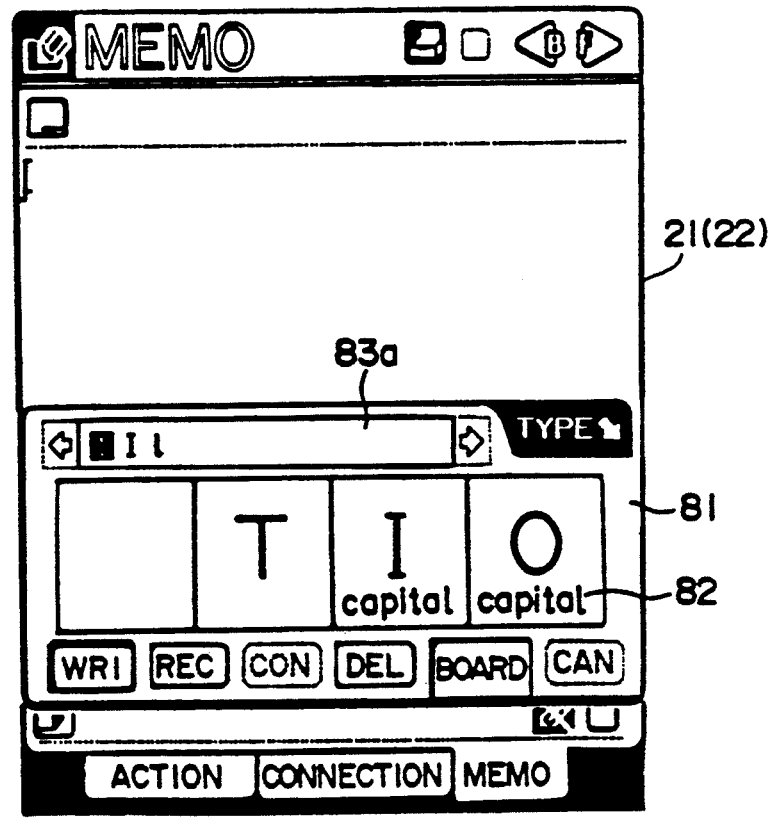

If the number 1 in the character display frame 82 in this state is touched by the pen 6, the display in the touched character display frame 82 is cleared and candidate characters for the character being displayed therein come to be displayed in the display portion 83a as shown in FIG. 38. In this embodiment, there are displayed three characters 'l', '1', and 'I' as the candidates for recognition. Since the number 1 was displayed until a moment ago, this number is reversely displayed.

Figure 39:
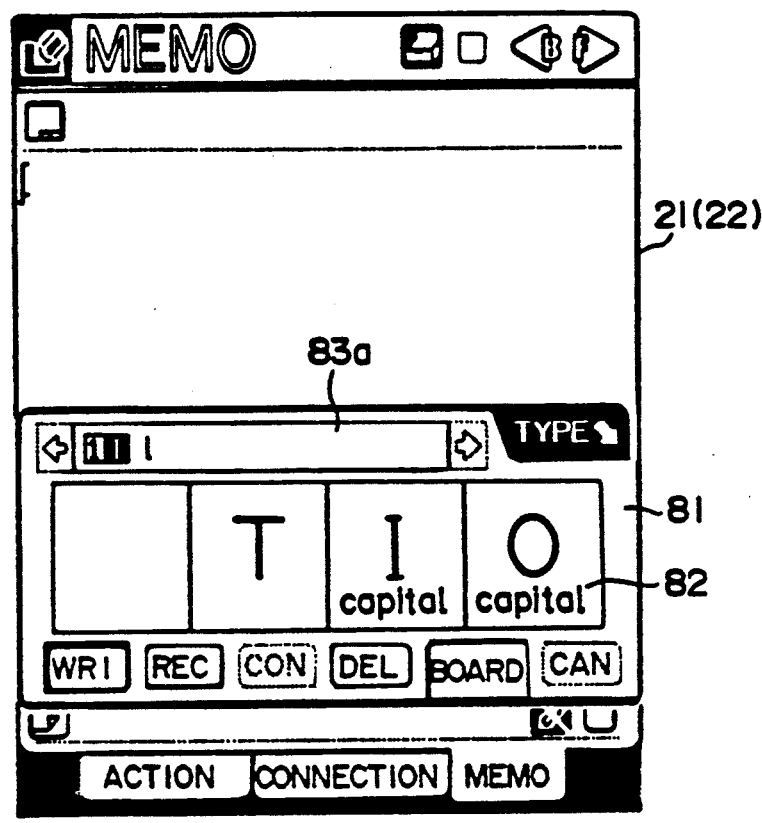
Figure 40:
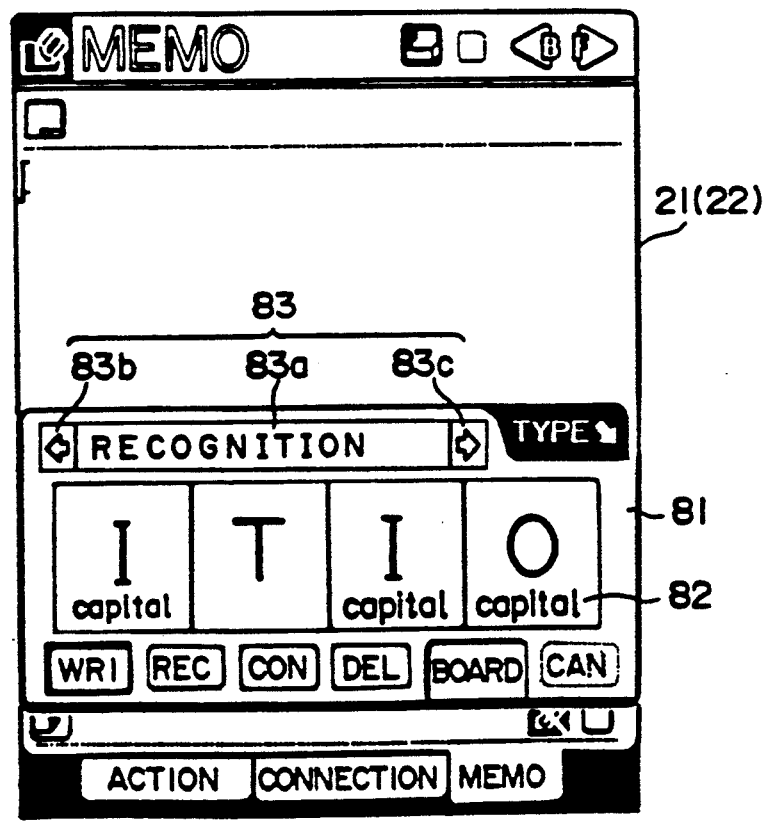

Then, if the capital I is touched by the pen 6, the display of this character is reversed as shown in FIG. 39, and when the pen 6 is separated from the capital I, the specified capital I comes to be displayed in the cleared character display frame 82 as shown in FIG. 40. At this time, in the character display frame 82, a display of explanatory words 'capital' indicating that the currently displayed character is a capital is additionally inserted.

Figure 41:
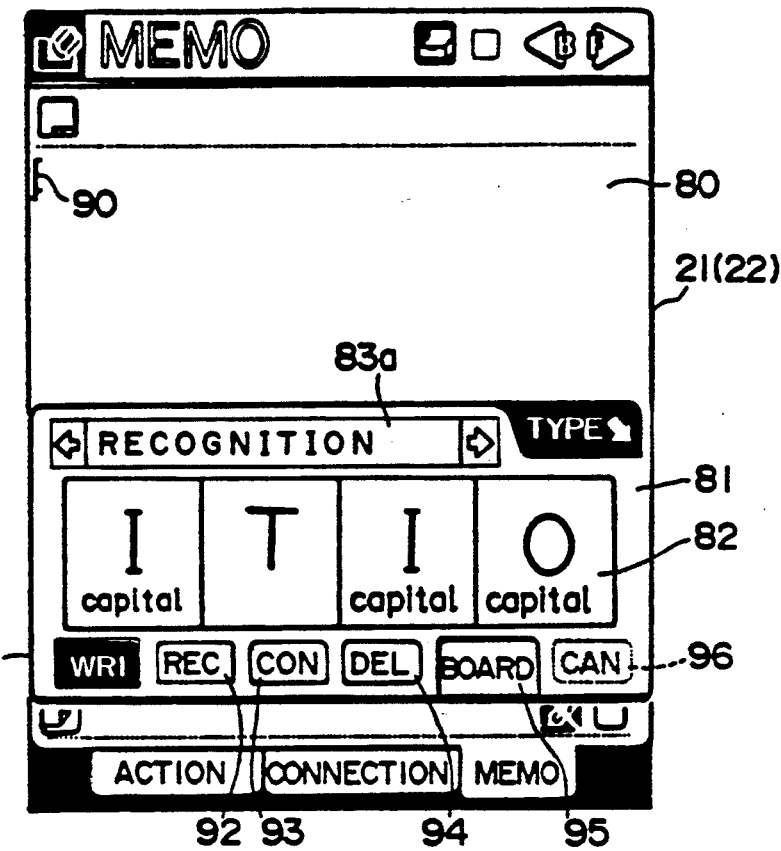
Figure 42:
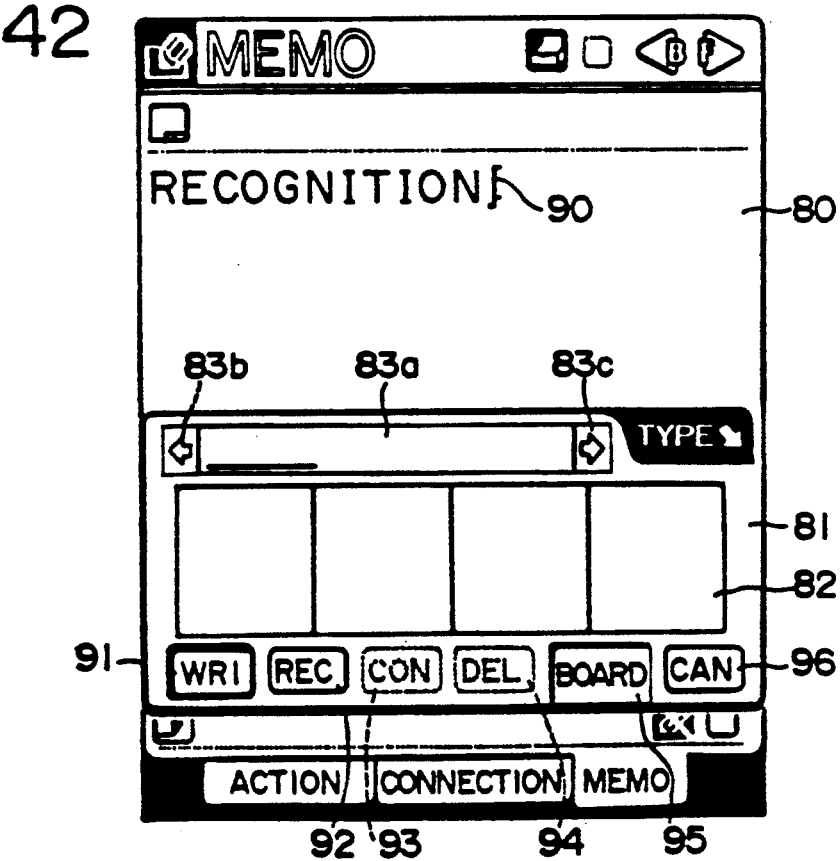

When right characters have been input to the display portion 83a of the logical character frame 83, if the write button 91 is touched by the pen 6 as shown in FIG. 41, the display of the write button 91 is reversed. When the pen 6 is separated from the write button 91, the characters which were displayed in the display portion 83a of the logical character frame 83 are written onto the page 80 at the position where the cursor 90 is located to be displayed thereon as shown in FIG. 42.

The type plate 81 further has a recognition button 92 operated when having an input character to the character display frame 82 recognized at specified timing, a backspace-and-delete button 94 operated when deleting an input character, a cancel button 96 for deleting an input character, a cancel button 96 for canceling an instruction once executed, and a board button 95 operated when exchanging the type plate 81 with another board, etc. Any button having characters thereon displayed obscurely indicates that the button is currently set in an inoperable mode.

In the above described embodiment, it was arranged such that a character string written in the character display frames 82 is once displayed in the display portion 83a of the logical character frame 83 and finally written onto the page 80. It is also possible to arrange such that the characters in the character display frame 82 are directly written onto the page 80, omitting the step of writing characters into the display portion 83a. If arranged so, however, the range of movement of the pen 6 during the correcting operation or normalizing operation becomes wider and the operability is thereby deteriorated. Therefore, it is preferable to dispose, as arranged in the above embodiment, the logical character frame 83 (comprising the leftward button 83b and rightward button 83c as operating portions, and the display portion 83a (this display portion 83a also functions as an operating portion)) in the vicinity of the character display frames 82 to thereby concentrated the movement of the pen 6 for preforming the normalization and correction of the characters into a narrow range and make effective operations possible.

According to one embodiment as described above, the operating portion has been provided within the logical character frame disposed in the vicinity of the character display frame and it has been arranged such that specified characters out of the characters displayed in the logical character frame are displayed in the character display frame when the operating portion is operated. Therefore, such operations as correction of a character can be preformed in a concentrated manner within a narrow operating range and, hence, the movement of the pen can be reduced and the character writing operation can be speeded up.

According to another embodiment, it is arranged such that characters displayed in the character display frames are normalized when the operating portion is operated. It therefore becomes possible to quickly review in right order the characters cyclically input to the character display frames, and thereby, confusion arising in the course of the cyclic inputting can be prevented.

Now, a further embodiment of the present invention will be described. Since, the structure of this embodiment is substantially the same as that of the above described embodiment, duplicate explanation thereof will be omitted.

Figure 43:
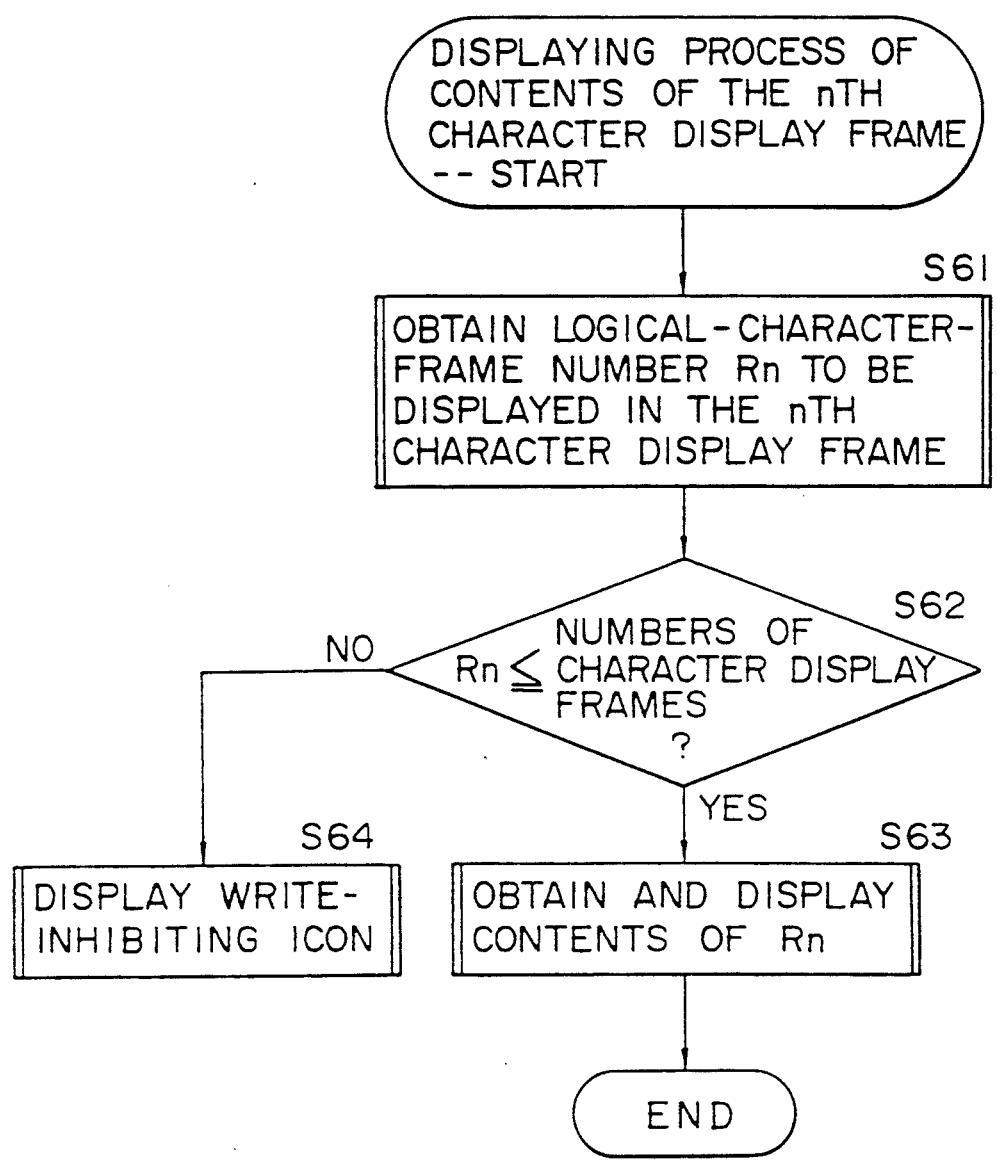
FIG. 43 is a flow chart explanatory of processes performed in another embodiment of the present invention.

First, a flow of operations in this embodiment will be described below referring to a flow chart of FIG. 43. The user inputs characters by handwriting one by one in four character display frames 82 from left to right. At this time, the CPU 41 executes the flow chart of FIG. 43.

In the step S61, the position number Rn in the logical character frame 83 to be displayed in the nth (n: 1-4) character display frame 82 is obtained. In the next step S62, the position number Rn and the number of positions in the logical character frame 83 are compared. In the present embodiment, it is adapted such that 11 characters can be displayed in the logical character frame 83. Hence, if the corresponding logical character frame number Rn is 11 or below, then, in the step S63, the contents of the corresponding logical character frame number Rn is displayed in the nth character display frame 82.

On the other hand, when the position number Rn in the logical character frame becomes larger than 11, then, in the step S64, and icon (mark) indicating that no more character is allowed to be written is displayed in the nth character display frame 82.

Figure 44:
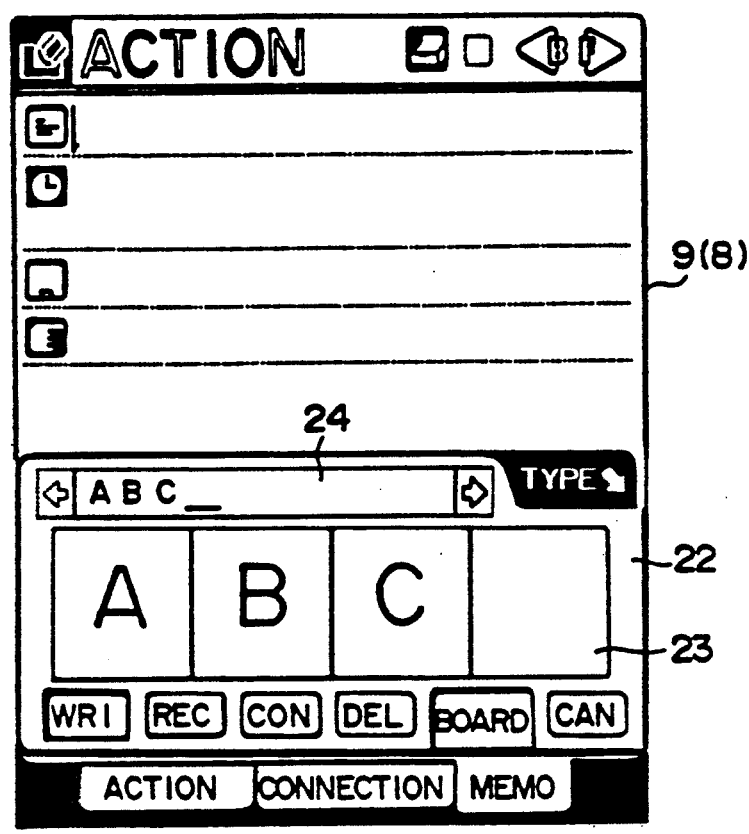
FIG. 44 to FIG. 48 are diagrams showing examples of display on the screen of the above embodiment.

The above operations will be described in more detail with reference to FIG. 44 to FIG. 48. The user inputs specified characters in the characters display frames 82 one by one from left to right. When four characters have been input, the next, fifth character will be written in the leftmost character display frame 82. Thus, the writing is carried out using the four character display frames cyclically. FIG. 44 shows the state where capitals ABC are input.

Figure 45:
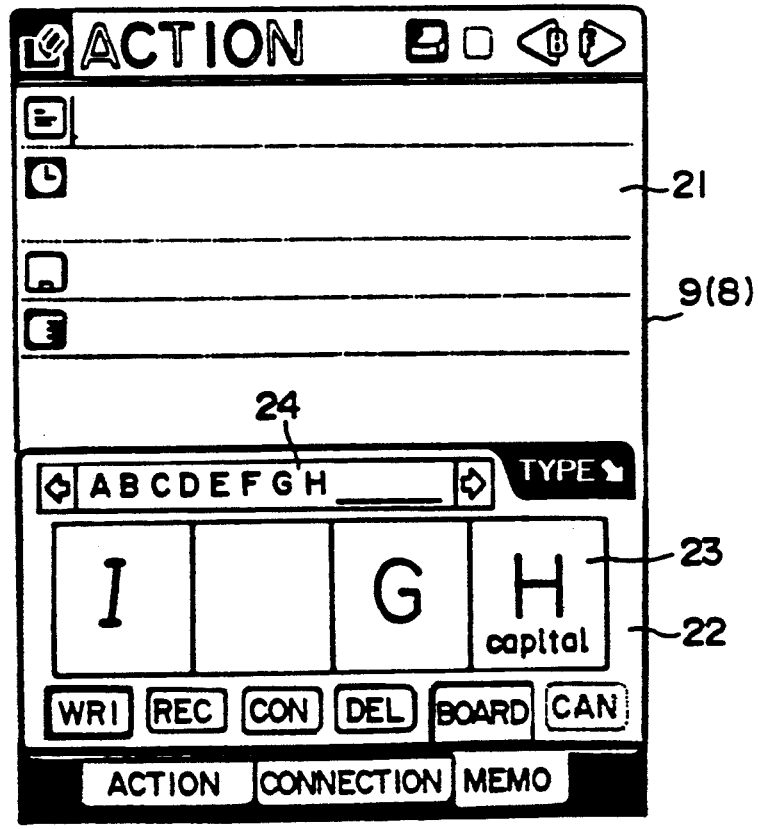

In the state shown in FIG. 45, ABCDEFGH are input and these characters are displayed in the logical character frame 83. Further, the next character I is handwritten in the first character display frame 82 but its traced loci are not yet recognized.

Figure 46:
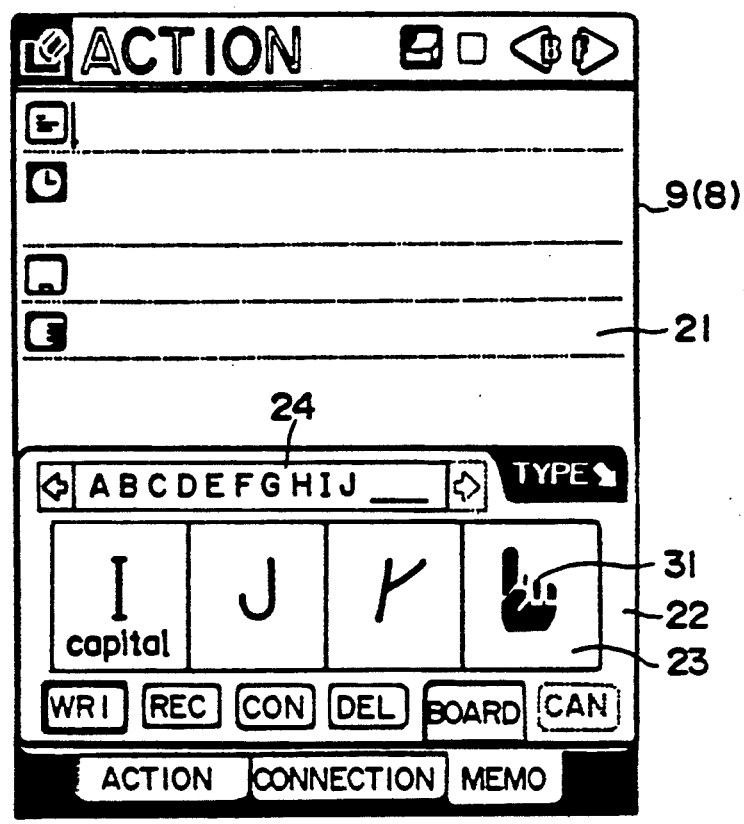

Then, as shown in FIG. 46, if K is input after I and J have already been input, then 11 characters in all will have been input. As a result, it becomes impossible to input any more character in the logical character frame 83. Accordingly, a mark (a mark of a hand in this embodiment) indicating that inputting of any more character is not allowed is displayed in the fourth character display frame 82, next to the third character display frame 82 is which the character K is input. Thereby, the user can notice that no more character can be input, before inputting the 12 th character. Therefore, the user is prevented from making a wasteful character inputting operation.

Figure 47:
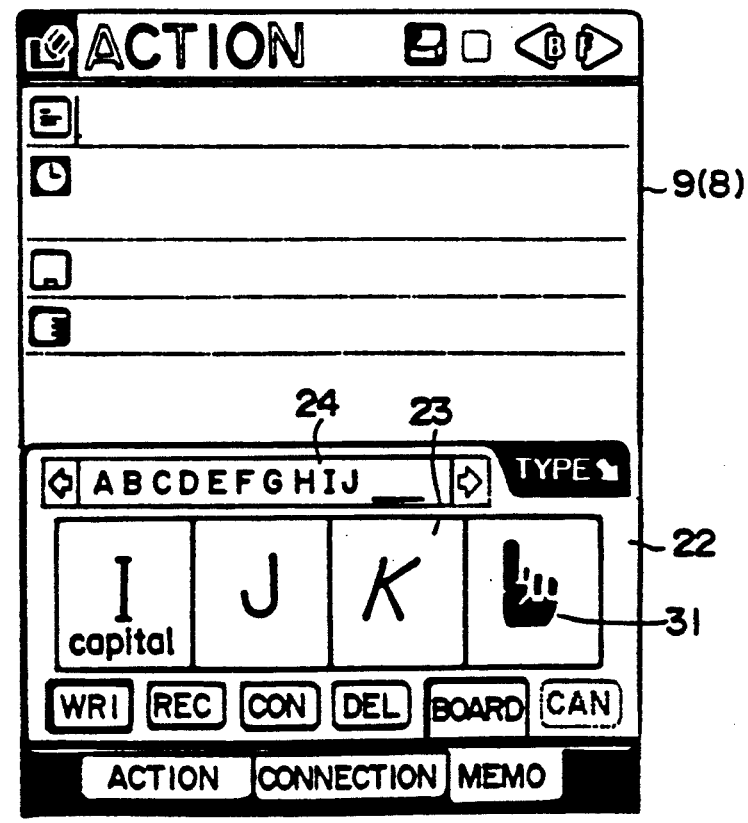
Figure 48:
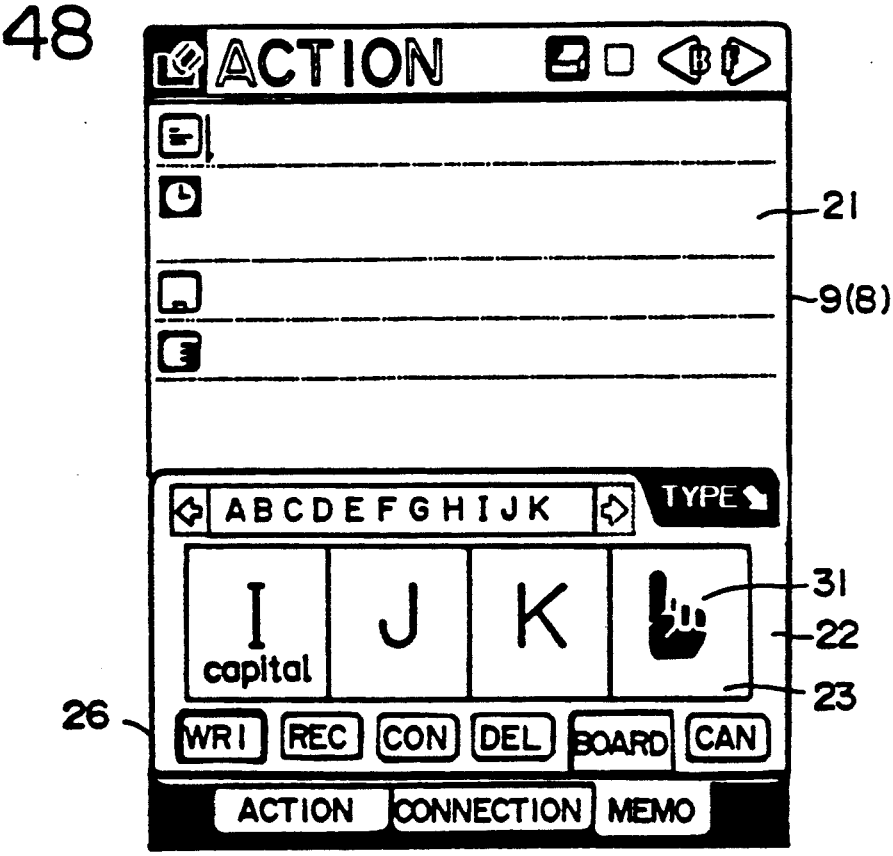

When, as shown in FIG. 47, inputting by handwriting of the 11 th character K is finished, then, as shown in FIG. 48, the character is recognized and the character obtained through the recognition is displayed. If the write button 91 is operated in this state, the characters in the logical character frame 83 are written onto the writing page portion 80.

If the number of the character display frames can be increased, the cyclic inputting as described above becomes unnecessary. If arranged so, however, the input display plane must be made larger. Then, the apparatus will become larger in size. In order to obtain portability of such apparatus as the electronic pocket notebook apparatus, it is preferred that the number of the character display frames is decreased to a certain degree and thereby the apparatus is made smaller in size. In such case, the arrangement for cyclical use of the character display frames makes character inputting possible without interrupting the flow of thoughts of the user.

According to the above described embodiment, it is arranged such that a predetermined mark is displayed in the character display frame when inputting of a handwritten character is inhibited in the course of cyclical inputting of handwritten characters to the character display frames. Accordingly, it becomes possible to let the user know that the limit to inputting characters is reached without giving the user an unpleasant feeling and causing the user to make wasteful inputting.

What is claimed is:
1. An apparatus for recognizing handwritten trace and inputting document information comprising:
   trace means for inputting handwritten characters;
   coordinate information detection means for detecting locus information provided by said trace means as coordinate information;
   a display superposed on said detection means for allowing an image displayed thereon to be recognized through said detection means;
   M character display frames to which said handwritten characters are successively input and in which results of recognition of the locus information are displayed substantially in a cyclic manner;
   a logical character frame disposed in the vicinity of said character display frames for temporarily displaying N (N>M) characters cyclically input from said character display frames;
   a writing page portion to which characters displayed in said logical character frame are finally transferred to be displayed thereon; and
   operating means for selecting at least one character displayed in said logical character frame and displaying each selected character in one of the character display frames to permit editing of each selected character.

2. An apparatus for recognizing handwritten trace and inputting document information according to claim 1, wherein the cyclic operation while characters are being input in said M character display frames in succession is performed such that, when a character is started to be input to the frame at a rear end, the character already input in the frame at a front end disappears and this frame assumes a standby state ready for the inputting of the next character.

3. An apparatus for recognizing handwritten trace and inputting document information according to claim 1, wherein said character display frames, logical character frame, writing page portion, and operating means are displayed on said display.

4. An apparatus for recognizing handwritten trace and inputting document information according to claim 1, wherein said operating means is comprised of at least two regions of said coordinate information detection means within said logical character frame, the operating means operative such that, when a character displayed in said logical character frame is selected, the selected character is thereby transferred to said character display frames to permit editing of each transferred character.

5. An apparatus for recognizing handwritten trace and inputting document information according to claim 1, wherein said operating means is comprised of a region of said coordinate detection means corresponding to direction designating buttons provided within said logical character frame, the operating means operative such that, when one of said direction designating buttons is operated, characters designated thereby are transferred to said character display frames to permit editing of each transferred character.

6. An apparatus for recognizing handwritten trace and inputting document information comprising:
   trace means for inputting handwritten characters;
   coordinate information detection means for detecting locus information provided by said trace means as coordinate information;
   a display superposed on said detection means for allowing an image displayed thereon to be recognized through said detection means;
   a plurality of character display frames to which said handwritten characters are successively input and in which results of recognition of the locus information are displayed substantially in a cyclic manner;
   a logical character frame for successively displaying characters cyclically input from said character display frames; and
   operating means for selecting at least one character displayed in said logical character frame and displaying each selected character in one of the character display frames to permit editing of each selected character.

7. An apparatus for recognizing handwritten trace and inputting document information comprising:
   trace means for inputting handwritten characters;
   coordinate information detection means for detecting locus information provided by said trace means as coordinate information;
   a display superposed on said detection means for allowing an image displayed thereon to be recognized through said detection means;
   a plurality of character display frames to which the handwritten characters are successively input and in which results of recognition of the locus information are displayed substantially in a cyclic manner;
   a logical character frame for successively displaying characters cyclically input from said character display frames;
   operating means for selecting at least one character displayed in said logical character frame and displaying each selected character in one of the character display frames to permit editing of each selected character; and
   control means for controlling said handwritten characters to be successively input to said character display frames and causing a predetermined mark to be displayed in said character display frame when inputting of a handwritten character is to be inhibited.

* * * * *